(12) United States Patent
Sawada

(10) Patent No.: US 7,684,722 B2
(45) Date of Patent: Mar. 23, 2010

(54) IMAGE FORMING APPARATUS HAVING A COMPARING UNIT AND A CONTROLLING UNIT

(75) Inventor: Kouichi Sawada, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 0 days.

(21) Appl. No.: 11/952,330

(22) Filed: Dec. 7, 2007

(65) Prior Publication Data

US 2008/0170874 A1 Jul. 17, 2008

(30) Foreign Application Priority Data

Jan. 16, 2007 (JP) ............................. 2007-007233

(51) Int. Cl.
G03G 21/00 (2006.01)
G03G 15/00 (2006.01)

(52) U.S. Cl. ...................................................... 399/82

(58) Field of Classification Search .................. 399/82, 399/407, 408, 409, 410
See application file for complete search history.

(56) References Cited

U.S. PATENT DOCUMENTS 5,625,860 A * 4/1997 Maeda et al. ............... 399/403

6,288,787 B1 * 9/2001 Kim ............................ 358/1.1
2006/0023245 A1 * 2/2006 Sato et al. ................... 358/1.13

FOREIGN PATENT DOCUMENTS

| JP | 09044052 A | * | 2/1997 |
|---|---|---|---|
| JP | 2001166636 A | * | 6/2001 |
| JP | 2003029956 A | * | 1/2003 |
| JP | 2003-54805 | | 2/2003 |
| JP | 2004-323192 | | 11/2004 |
| JP | 2006-1044 | | 1/2006 |

* cited by examiner

Primary Examiner—Quana M Grainger
(74) Attorney, Agent, or Firm—Cantor Colburn LLP

(57) ABSTRACT

Disclosed is an image forming apparatus which registers jobs in an order of acceptance of the jobs and which carries out an image forming process and a post-processing for a recording medium according to a content of the registered jobs comprising a comparing unit to compare a time needed for a post-processing of a first job which is being executed with a time needed for an image forming process of a second job which is on stand-by and which is registered and a control unit to execute the image forming process of the second job which is on stand-by after an image forming process of the first job which is being executed is ended and while the post-processing of the first job is being executed according to a comparison result of the comparing unit.

14 Claims, 9 Drawing Sheets

IMAGE FORMING APPARATUS HAVING A COMPARING UNIT AND A CONTROLLING UNIT

BACKGROUND OF THE INVENTION

1. Field of the Invention

The present invention relates to an image forming apparatus which can accept a plurality of job data, which carries out copying and printing based on the accepted job and which can carry out a post-processing for the recording medium which has been copied or printed, an image forming method and a computer readable recording medium storing a program.

2. Description of Related Art

In recent years, an image forming apparatus which executes the print jobs (an image data and an output condition of the image data) instructing the image forming operations transmitted from personal computers or the like which are network connected in the order of acceptance, which carries out an image forming process for the recording medium, and which comprises a finisher (post-processing function) to automatically carry out a part of the operation such as a stapling, a punching, a sheet-cutting process, a cutting process and the like for a bundle of recording medium after the image forming process which used to be carried out by man power is being developed.

When a plurality of print jobs are received, the above described image forming apparatus executes the print jobs in the order of acceptance. Therefore, in a case where there are many print jobs which take time for post-processing, there is no choice but to temporarily stop the image forming unit which carries out the image forming, and a great amount of time is needed until all of the images of the received print jobs are formed on the recording medium based on each print job. Thus, there is a problem that the productivity declines.

For example, JP2003-54805A discloses a technique for shortening the post-processing time by the image forming apparatus comprising a driving unit in each carrying passage of an entrance carrying passage of a recording paper to be ejected, a carrying passage in a direction of the paper ejection tray of the body from the first switching unit and a carrying passage in a direction of the elevating paper ejection tray or the fixed paper ejection tray, by detecting the position of the recording paper which is in the middle of the carrying passage, and by independently determining the carrying rate and the timing as a method to solve the problem of the reduction of productivity.

Moreover, JP2004-323192A discloses a post-processing apparatus including a sorting unit which disposes the paper to with the binding process at the binding process position or which disposes the paper without the binding process at the paper ejection position according to the way of post-processing of the paper, a binding process unit to carry out the binding process for the paper disposed at the binding process position and a paper ejection unit to eject the paper disposed at the paper ejection position outside.

Furthermore, JP2006-1044A discloses a technique of changing the execution order of the jobs according to each of the content of the post-processing of the executed job and the registered job (either one of the type of the post-processing, the carrying passage used when the post-processing is carried out, the output of the recording medium to be output and the length of the time needed for the post-processing).

However, the timing to execute the next job is not suggested in the conventional technique such as the technique disclosed in JP2003-54805A or JP2004-323192A. Therefore, the timing in which the next job to be executed is not clear. Further, in the conventional technique such as the technique disclosed in JP2006-1044A, there is a possibility that a case where the image forming process of the foregoing job which is to be restarted after the interrupted job is made to be on stand-by occurs according to the time needed for the image forming of the next job which was allowed to interrupt during the foregoing job which is divided in each copy when the image forming process of the next job is executed during the post-processing of the job which is being executed earlier. Therefore, the ending time of all copies of the foregoing job will be delayed, and there remains a problem that the entire productivity declines.

SUMMARY OF THE INVENTION

In view of the above problem, the main object of the present invention is to improve the efficiency of the image forming operation and to speed-up the image forming operation by reducing the temporary stop time of the image forming operation, and to improve the productivity.

To achieve at least one of the above objects, an image forming apparatus reflecting one aspect of the present invention is an image forming apparatus which registers jobs in an order of acceptance of the jobs and which carries out an image forming process and a post-processing for a recording medium according to a content of the registered jobs, comprises: a comparing unit to compare a time needed for a post-processing of a first job which is being executed with a time needed for an image forming process of a second job which is on stand-by and which is registered, and a control unit to execute the image forming process of the second job which is on stand-by after an image forming process of the first job which is being executed is ended and while the post-processing of the first job is being executed according to a comparison result of the comparing unit.

To achieve at least one of the above objects, an image forming apparatus reflecting one aspect of the present invention is an image forming apparatus, comprises: a dividing unit to divide jobs for a plurality of copies into a plurality of divided jobs when the jobs are registered in an order of acceptance of the jobs, the divided jobs being generated by dividing the jobs as an independent job for each copy, a divided job comparing unit to compare a time needed for a post-processing of the divided job which is generated by dividing one job by the dividing unit with a time needed for an image forming process of a divided job which is generated by dividing another job, and a registration control unit to change a registration order of the divided jobs which are generated by dividing the another job according to a comparison result of the dividing job comparing unit.

To achieve at least one of the above objects, an image forming method reflecting one aspect of the present invention is an image forming method which registers jobs in an order of acceptance of the jobs and which carries out an image forming process and a post-processing for a recording medium according to a content of the registered jobs, comprising: comparing a time needed for a post-processing of a first job which is being executed with a time needed for an image forming process of a second job which is on stand-by and which is registered, and executing the image forming process of the second job which is on stand-by after an image forming process of the first job which is being executed is ended and while the post-processing of the first job is being executed, according to a comparison result obtained by the comparing.

To achieve at least one of the above objects, an image forming method reflecting one aspect of the present invention is an image forming method, comprising: dividing jobs for a plurality of copies into a plurality of divided jobs when the jobs are registered in an order of acceptance of the jobs, the divided jobs being generated by dividing the jobs as an independent job for each copy, comparing a time needed for a post-processing of the divided job which is generated by dividing one job by the dividing unit with a time needed for an image forming process of a divided job which is generated by dividing another job, and changing a registration order of the divided jobs which are generated by dividing the another job according to a comparison result obtained by the comparing.

To achieve at least one of the above objects, a computer readable recording medium storing a program reflecting one aspect of the present invention is a computer readable recording medium storing a program to allow a computer to function as a comparing unit to compare a time needed for a post-processing of a first job which is being executed with a time needed for an image forming process of a second job which is on stand-by and which is registered, and a control unit to execute the image forming process of the second job which is on stand-by after an image forming process of the first job which is being executed is ended and while the post-processing of the first job is being executed, according to a comparison result of the comparing unit.

BRIEF DESCRIPTION OF THE DRAWING

The present invention will become more fully understood from the detailed description given hereinbelow and the appended drawings, and thus are not intended as a definition of the limits of the present invention, and wherein.

DESCRIPTION OF THE PREFERRED EMBODIMENTS

First Embodiment

Hereinafter, the first embodiment of the present invention will be described with reference to the drawings.

First, the structure will be described.

Figure 1:
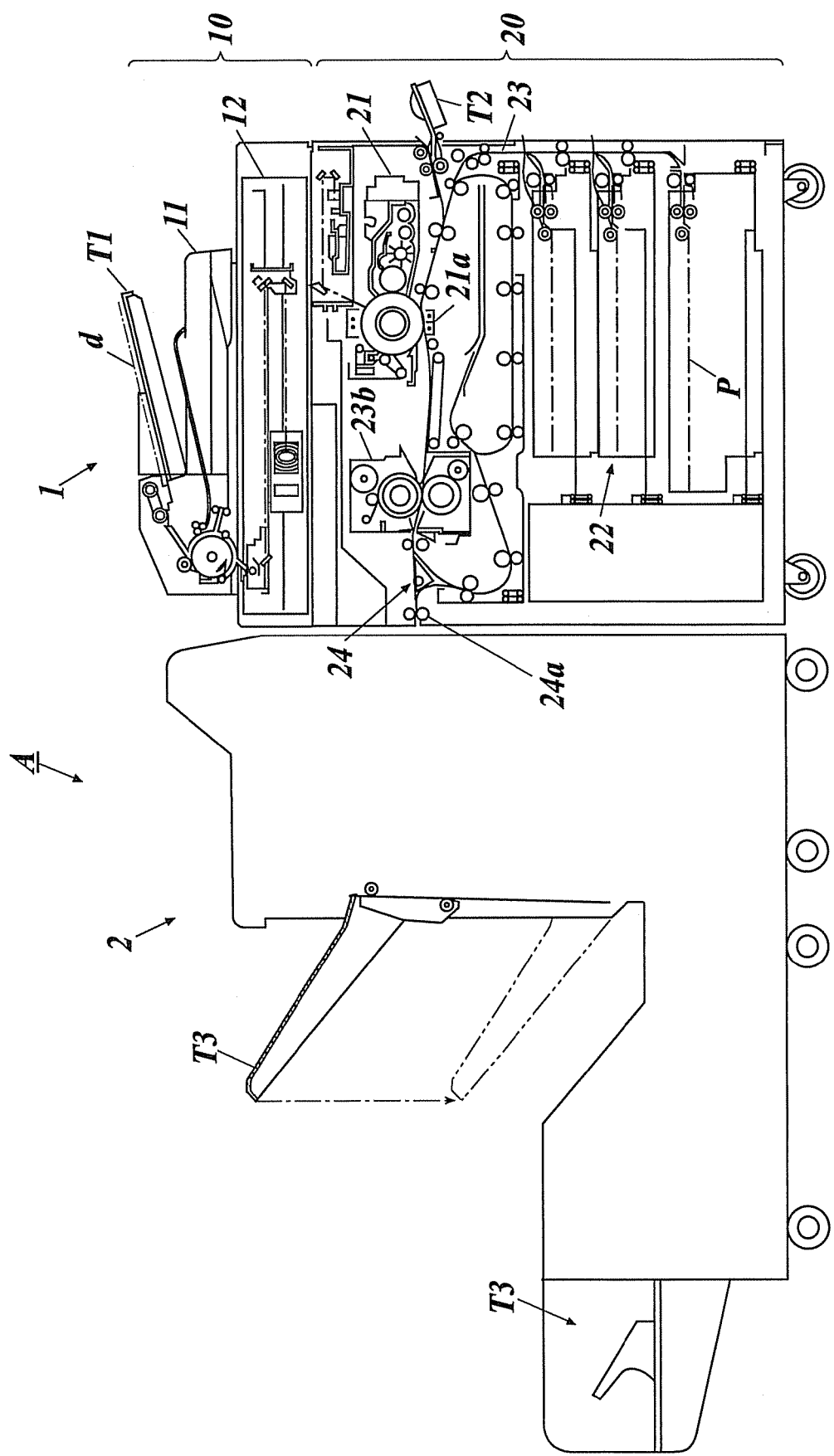
FIG. 1 is a cross sectional diagram of an image forming apparatus according to the first embodiment.

FIG. 1 shows a cross sectional diagram of an image forming apparatus A according to the first embodiment.

The image forming apparatus A is a digital multi function peripheral comprising a copying function which reads an image from a document and forms the read image on a recording medium P such as a paper or the like as a to-be-processed paper, a printer function which receives an image data from a personal computer or the like, forms the image expressed by the image data on the recording medium and outputs the recording medium, a scanner function which reads an image from a document, stores the read image data and transmits the read image data outside, and the like. The image forming apparatus A further comprises a post-processing function or the like which carries out the post-processing such as a stapling process, a punching process, a folding process, a sheet-cutting process, a cutting process and the like for the recording medium on which the image is formed. As shown in FIG. 1, the image forming apparatus A is constituted of a body unit 1 and a post-processing unit 2 as a unit to carry out the post-processing.

The body unit 1 is constituted of an image reading unit 10 and a printing unit 20.

The image reading unit 10 comprises an automatic paper sending unit 11 which is called the ADF (Auto Document Feeder) and a reading unit 12.

A document d placed on a document tray T1 of the automatic paper sending unit 11 is carried to the contact glass which is the reading position of the reading unit 12, the image on one surface or both surfaces of the document d is read by the optical system of the reading unit 12, and the image of the document d is read by the CCD (Charge Coupled Device) image sensor 12a. Here, an image is not limited to the image data such as a diagram, a photograph and the like, but also includes text data or the like such as letters, symbols and the like.

The image (analog image signal) read by the reading unit 12 is output to the after mentioned image control unit, and is output to a printing unit 20 after the A/D conversion and various types of imaging processes are carried out in the image control unit.

The printing unit 20 as a unit to carry out the image forming process carries out the electro photography type image forming process based on the print data which is input, and comprises an image forming unit 21, a paper feeding unit 22, a paper carrying unit 23, a fixing unit 24 and an exporting unit 25.

The image forming unit 21 comprises a photosensitive drum, a charging device, an exposure device to output light which expresses the image data, a developing device, a transferring device 21a and a cleaning unit.

Particularly, an electrostatic latent image is formed by emitting light by the exposure device to the photosensitive drum which is charged by the charging device. Further, the developing device develops the electrostatic latent image by attaching the charged toner on the surface of the photosensitive drum on which the electrostatic latent image is formed. The toner image formed on the photosensitive drum by the developing device is transferred on the recording medium P in the transferring device 21a. Moreover, the residual charge, the residual toner and the like on the surface of the photosensitive drum are removed by the cleaning unit after the toner image is transferred to the recording medium P.

The paper feeding unit 22 comprises a plurality of paper feeding cassettes, a paper feeding unit and a manual tray T2. The recording medium P which are differentiated by size and type in advance are contained in each paper feeding cassette, and the contained recording medium P is carried toward the paper carrying unit 23 one by one from the top by the paper feeding unit. The manual tray T2 can load various types of recording mediums P according to the needs of a user on a case-by-case basis, and the loaded recording medium p is carried toward the paper carrying unit 23 one by one from the top by the paper feeding roller.

The paper carrying unit 23 sends the recording medium P which is carried from the paper feeding unit 22 to the transferring device 21a via a plurality of intermediate rollers, a resist roller and the like.

The fixing unit 24 fixes the transferred toner image to the recording medium P which is carried by the paper carrying unit 23 by heat. The recording medium P to which the fixing process is carried out, is output to the post-processing unit 2 from the exit 25a by being sandwiched by the paper ejection roller of the exporting unit 25.

The post-processing unit 2 comprises a sorting unit to carry out the sorting process of the recording medium on which the image is formed by the body unit 1, a punching unit to carry out the punching process which opens punched-holes, a stapling unit to carry out the stapling process which staples a bundle of the recording mediums, a folding unit to carry out the fording process, a sheet-cutting unit to carry out the sheet-cutting process, a cutting unit to carry out the cutting process and the like. The post-processing unit 2 is a finisher which carries out various types of the post-processing. The recording medium in which the various types of post-processing are carried out or the recording medium in which the various types of post-processing are not carried out are ejected to the paper ejecting tray T3.

The post-processing unit 2 may comprise an elevating paper ejecting tray which is capable of containing a large number of the recording medium P and a post-processing unit to execute other post-processing.

Figure 2:
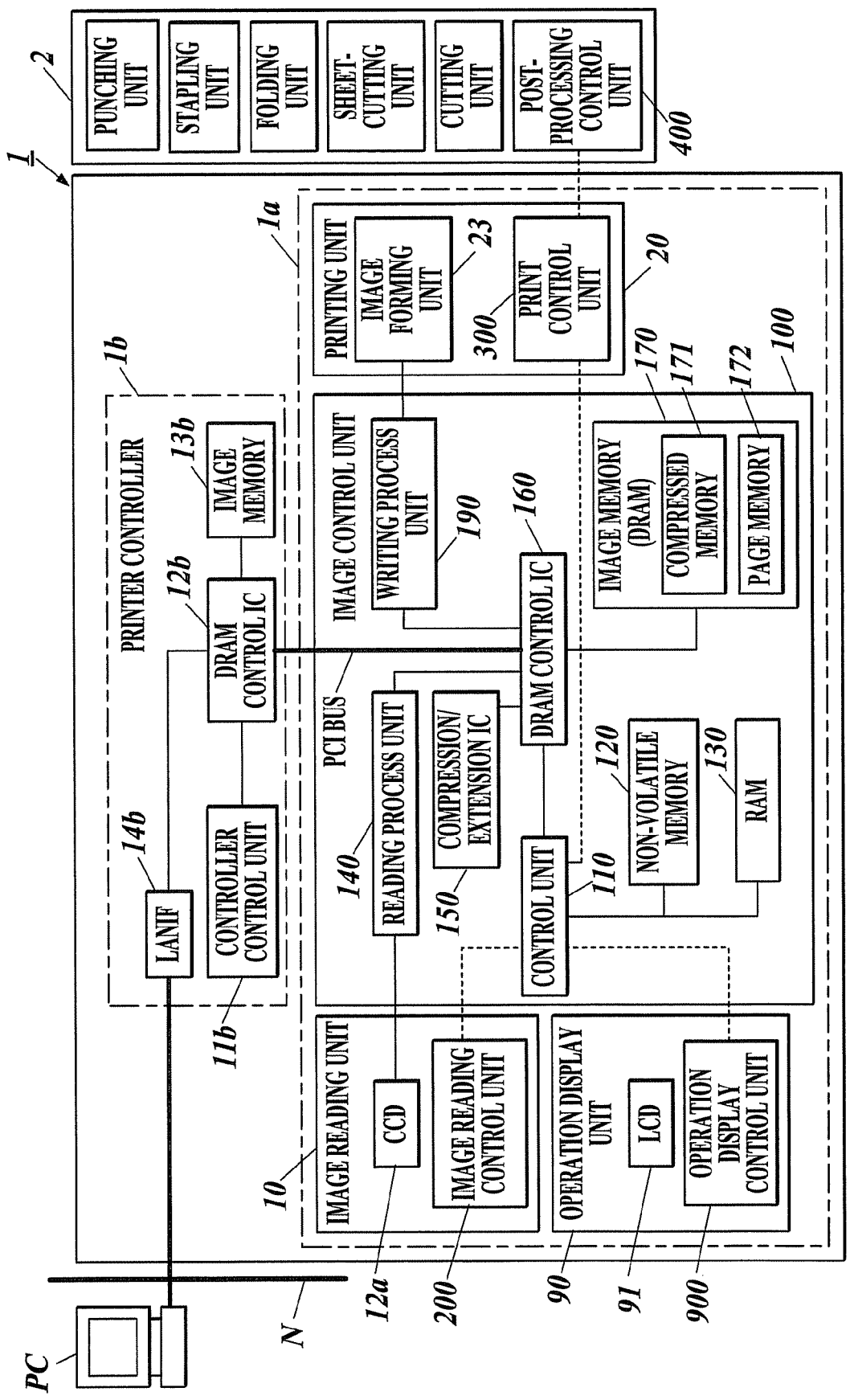
FIG. 2 is a control block diagram of an image forming apparatus according to the first embodiment.

FIG. 2 shows a control block diagram of the image forming apparatus A of the first embodiment.

As shown in FIG. 2, the image forming apparatus A comprises a body control unit 1a to control the body unit 1, a printer controller 1b and the post-processing unit 2 connected with the body unit 1. The body control unit 1a is connected with a user terminal PC on the network N via the LANIF (Local Area Network InterFace) 14b of the printer controller 1b so as to send and receive information to and from one another.

The body control unit 1a comprises an image reading unit 10, a printing unit 20, an operation display unit 90 and an image control unit 100. Here, the same reference numerals are used for the structures same as each unit described in FIG. 1, and the descriptions are omitted.

The image control unit 100 comprises a control unit 110, a non-volatile memory 120, a RAM (Random Access Memory) 130, a reading process unit 140, a compression/extension IC 150, a DRAM (Dynamic Random Access Memory) control IC 160, an image memory 170 and a writing process unit 190.

The control unit 110 is constituted of a CPU (Central Processing Unit) or the like, and controls the operation of each unit of the image forming apparatus A according to various typed of process programs stored in the non-volatile memory 120 in a concentrated manner. For example, the control unit 110 switches the copy mode, the printer mode and the scanner mode according to the operation signal input from the operation display unit 90, and reads the process program for each mode which are stored in the non-volatile memory 120 and controls the copying, the printing and the reading of the image data and the like. Further, the control unit 110 sets the post-processing of the recording medium P which is print-output according to the operation signal input from the operation display unit 90 and the data input from the user terminal PC.

Moreover, in order to realize the first embodiment, the control unit 110 reads the job registration program and job execution program according to the first embodiment and various types of modes or the like and various types of data input from the operation display unit 90 from the non-volatile memory 120 and reads the job queue and the job data from the RAM 130, and controls the execution order of a plurality of jobs due to the co-operation of the programs and the various types of data. That is, when the jobs which are registered in the order of acceptance (hereinafter, called the registered job) are executed, the control unit 110 of the first embodiment executes the image forming process of the job which is waiting for the output execution (hereinafter, called the stand-by job) by allowing the image forming process of the stand-by job to interrupt during the post-processing of the job which is being executed (hereinafter, called the executed job) by the body unit 1 and the post-processing unit 2 and to executed the job which is on stand-by.

Here, job indicates a series of operations relating to the image forming process, the post-processing and the like carried out by the image forming apparatus A. For example, when a plurality of documents are to be output, a series of operations relating to the output of the plurality of documents is one job. When a plurality of copies of a document are to be output, a series of operations relating to the output of the plurality of copies of the document is one job.

The non-volatile memory 120 is a computer readable recording medium which stores the job registration program and the job execution program according to the first embodiment, the various types of modes or the like and the various types of data accepted by the operation display unit 90, the data to set the post-processing for the recording medium P in which the image forming process is carried out to the post-processing control unit 400 via the printing unit 20, the data processed by the various types of programs and the like other than the various types of process programs and data according to the image forming.

The job registration program of the first embodiment is a program which registers the jobs in the order of acceptance and to generate a matrix data (hereinafter, called the job queue) of the jobs which are registered (registered job).

The job execution program of the first embodiment is a program to compare the time (tn) needed for the post-process of the job (executed job) which is being executed and the time (tm) needed for the image forming process of the stand-by job according to the after mentioned various types of modes accepted by the operation display unit 90 when the registered job is to be executed, and to execute the job execution program which executes the image forming process of the stand-by job while the post-processing of the executed job is being executed which is after the image forming process of the executed job is ended according to the result of the above comparison.

When the result of comparing the time (tn) needed for the post-processing of the executed job and the time (tm) needed for the image forming process of the stand-by job shows that the time (tn) needed for the post-processing of the executed job is longer then the time (tm) needed for the image forming process of the stand-by job (tn>tm), the job execution program executes the image forming process of the stand-by job by allowing the image forming process of the stand-by job to interrupt. On the other hand, when the time (tn) needed for the post-processing of the executed job is less than or equal to the time (tm) needed for the image forming process of the stand-by job (tn≦tm), a process in which the image forming process of the stand-by job is not executed by not allowing the image forming process of the stand-by job to interrupt is carried out even after the image forming process of the executed job is ended.

Particularly, when the executed job or the stand-by job is constituted of one copy or a plurality of copies, the job execution process executes the stand-by job for one copy by one copy according to the after mentioned various types of modes, and the job execution process also executes the image forming process of the stand-by job by allowing the image forming process of the stand-by job to interrupt while the image forming process of the executed job is temporarily stopped by executing the post-processing of an arbitrary copy of the executed job according to the result of comparing the time (tn1) needed for the post-processing of one copy of the executed job and the time (tm1) needed for the image forming process of one copy of the stand-by job or the time (tn1) needed for the post-processing of one copy of the executed job and the time (tm) needed for the image forming process for all copies of the stand-by job.

In a case where the executed job and the stand-by job is constituted of one copy or a plurality of copies and where the time (tn1) needed for the post-processing of one copy of the executed job and the time (tm1) needed for the image forming process of one copy of the stand-by job are compared, the job execution process executes the image forming process of the stand-by job by allowing the image forming process of the stand-by job to interrupt while the image forming process of the executed job is temporarily stopped by executing the post-processing of the arbitrary copy of the executed job when the comparison result shows that the time (tn1) needed for the post-processing of one copy of the executed job is longer than the time (tm1) needed for the image processing of one copy of the stand-by job (tn1>tm1). On the other hand, the job execution process carries out a process in which the image forming process of the stand-by job is not executed by not allowing the image forming process of the stand-by job to interrupt while the image forming process of the executed job is temporarily stopped by executing the post-processing of the arbitrary copy of the executed job when the time (tn1) needed for the post-processing of one copy of the executed job is less than or equal to the time (tm1) needed for the image forming process of one copy of the stand-by job (tn1≦tm1).

Here, the post-processing of the arbitrary copy of the executed job means the post-processing of the $n^{th}$ copy (n is a given positive integer less than or equal to the set number of copies) of the executed job.

In a case where the executed job and the stand-by job is constituted of one copy or a plurality of copies and where the time (tn1) needed for the post-processing of one copy of the executed job and the time (tm) needed for the image forming process of all the copies of the stand-by job are compared, the job execution process executes the stand-by job by allowing the stand-by job to interrupt while the image forming process of the executed job is temporarily stopped by executing the post-processing of the arbitrary copy of the executed job when the comparison result shows that the time (tn1) needed for the post-processing of one copy of the executed job is longer than the time (tm) needed for the image forming process of all copies of the stand-by job (tn1>tm). On the other hand, the job execution process carries out a process in which the stand-by job is not executed by not allowing the stand-by job to interrupt while the image forming process of the executed job is temporarily stopped by executing the post-processing of the arbitrary copy of the executed job when the time (tn1) needed for the post-processing of one copy of the executed job is less than or equal to the time (tm) needed for the image forming process of all copies of the stand-by job (tn1≦tm).

Moreover, the job execution process restarts the image forming process of the executed job which has been temporarily stopped according to the after mentioned various types of modes after the post-processing of the arbitrary copy of the executed job is ended and after the image forming process of the stand-by job which is being executed while the image forming process of the executed job is temporarily stopped is ended.

Particularly, when the stand-by job is constituted of a plurality of copies, the job execution process temporarily stops the image forming process of the stand-by job and carries out a process to restart the image forming process of the executed job which has been temporarily stopped after the post-processing of the arbitrary copy of the executed job is ended and after the image forming process of the arbitrary copy of the stand-by job which is being executed while the image forming process of the executed job is temporarily stopped is ended.

In such way, the job execution process realizes a function as the comparing unit and the control unit by executing the job execution program which is stored in the non-volatile memory 120 by the control unit 110 co-operating with the RAM 130 and the like.

The RAM 130 forms a work area to temporarily store various types of programs to be executed by the control unit 110 and the data according to the programs, and stores the job queue, various types of operation settings, job data of each job, various types of work data and the like.

The job data is constituted of data shared by pages which are output (page shared data) and data of each page which is output (page specific data) based on the print condition and the image data.

The page shared data includes the data input from the user terminal PC and the setting condition based on the operation signal input from the after mentioned operation display unit 90. For example, the page shared data includes a set number of copies expressing the number-of output copies of the recording medium P, a number of output copies expressing the value of the number of output copies which are counted, a number of fed papers expressing the number of papers per copy which are fed from the tray, a paper ejection tray to receive the recording medium P in which the image forming process or the post-processing is carried out, various types of post-processing settings expressing the type of the post-processing and the like.

The page specific data is constituted of an image rotation angle at an output which is an angle in which the print data is to be rotated, an image storing address indicating the address in which the print data of each page is stored and the like so that the direction of the print data which is to be output and the direction of the recording medium P which is used match one another.

The reading process unit 140 generates the digital image data after carrying out various types of processes such as an analog process, an A/D converting proves, a shading process and the like for the analog image signal input from the CCD image sensor 12a of the image reading unit 10. The generated image data is output to the compression/extension IC 150.

The compression/extension IC 150 carries out a compression process for the digital image data which is input, and further, carries out an extension process for the compressed image data to be input, and outputs the image data which is to the DRAM control IC 160.

The DRAM control IC 160 controls the compression process of the digital image data and the extension process of the compressed image data by the compression/extension IC 150 according to the instruction from the control unit 110, and controls the input and the output of the image data to and from the image memory 170.

For example, when the image reading unit 10 instructs to store the document image to be read, the compression process is carried out for the digital image data input from the reading process unit 140 by the compression/extension IC 150, and the compressed image data is stored in the compressed memory 171 of the image memory 170. Further, when it is instructed to print output the compressed image data stored in the compressed memory 171, the compressed image data is read from the compressed memory 171, the extension process is carried out for the compressed image data by the compression/extension IC 150, and the image data is stored in the page memory 172. Moreover, when it is instructed to print output the non-compressed image data stored in the page memory 172, the non-compressed image data is read from the page memory 172 and is output to the writing process unit 190.

The image memory 170 comprises the compressed memory 171 which is constituted of the DRAM (Dynamic RAM) and the page memory 172. The compressed memory 171 is a memory to store the compressed image data. The page memory 172 is a memory to temporarily store the non-compressed image data which is the object to be print output before the print output.

The writing process unit 190 generated the print data for image forming based on the non-compressed image data input from the DRAM control IC 160, and outputs the generated print data to the printing unit 20.

The image reading unit 10 comprises a CCD image sensor 12*a* and an image reading control unit 200, and the automatic paper sending unit 11 and the reading unit 12 shown in FIG. 1 although they are omitted from the drawing here. The image reading control unit 200 controls the automatic paper sending unit 11, the reading unit 12 and the like, executes scanning of the surface of the document placed on the contact glass by light exposure, reads the reflection of the light by carrying out the opto-electric conversion by the CCD image sensor 12*a*. The read analog image signal is output to the reading process unit 140 of the image control unit 100.

The printing unit 20 comprises each unit according to the print output such as the image forming unit 21 and the like shown in FIG. 1 and a print control unit 300. The print control unit 300 controls the operation of each unit of the printing unit 20 such as the image forming unit 21 and the like according to the instruction from the control unit 110, forms the image on the recording medium P based on the image data input from the writing process unit 190, and outputs the instruction signal which operates each unit of the post-processing unit 2 to the post-processing unit 400 according to the instruction from the control unit 110.

The operation display unit 90 comprises a LCD (Liquid Crystal Display) 91, an operation display control unit 900 and a group of operation keys which is omitted from the drawing. A touch panel is provided on the LCD 91 so as to cover the LCD 91, and the operation display control unit 900 displays a basic screen to input the print condition, various typed of processing results and the like on the LCD 91 according to the display signal input from the control unit 110. Further, the operation display control unit 900 outputs the operation signal input from the group of operation keys or the touch panel to the control unit 110.

Moreover, the operation display unit 90 displays a screen for selecting various types of modes in which various types of modes can be selected in the job execution process on the LCD 91, accepts the operation instruction of the various types of modes, and outputs the operation signal corresponding to the operation instruction to the control unit 110.

The operation display unit 90 displays the comparison mode selecting screen to accept the selecting instruction of either one of the first comparison mode which compares the time (tn1) needed for the post-processing of one copy of the executed job and the time (tm1) needed for the image forming process of one copy of the stand-by job and the second comparison mode which compares the time (tm1) needed for the post-processing of one copy of the executed job and the time (tm) needed for the image forming process of all the copies of the stand-by job on the LCD 91. Thereby, the operation display unit 90 realizes a function as a comparing object selecting unit which outputs the operation signal indicating the selecting instruction which is the first comparison mode or the second comparison mode based on the screed to the control unit 110.

In such way, the selecting instruction for selecting either one of the first comparison mode and the second comparison mode can be accepted. Therefore, the comparison object can be set according to the preference of a user, and flexibility of the control can be improved.

Moreover, the operation display unit 90 displays the execution mode selecting screen to accept the selecting instruction for selecting either one of the first execution mode which executes the stand-by job by allowing the stand-by job to interrupt while the image forming process of the executed job is temporarily stopped by executing the post-processing of the arbitrary copy of the executed job, the second execution mode which does not executed the stand-by job by not allowing the stand-by job to interrupt while the image forming process of the job is temporarily stopped by executing the post-processing of the arbitrary copy of the executed job and the third execution mode which executes the process of executing the stand-by job by allowing the stand-by job to interrupt while the image forming process of the executed job is temporarily stopped by executing the post-processing of the arbitrary copy of the executed job according to the comparison result of the above mentioned job execution process by the control unit 110 on the LCD 91. Further, the operation display unit 90 realizes a function as an execution job selecting unit which output the operation signal indicating the selecting instruction for selecting either one of the first execution mode, the second execution mode and the third execution mode based on the screen to the control unit 110.

In such way, the selecting instruction for selecting either one of the first execution mode, the second execution mode and the third execution mode can be accepted. Therefore, flexibility of the interruption setting of the order of the jobs which is executed according to the request of a user can be improved.

Moreover, the operation display unit 90 displays the restart mode selecting screen to accept the selecting instruction for selecting either one of the first restart mode which temporarily stops the image forming process of the stand-by job and restarts the image forming process of the executed job which has been temporarily stopped after the post-processing of the arbitrary copy of the executed job is ended and after the image forming process of the arbitrary copy of the stand-by job which is being executed while the image forming process of the executed job is temporarily stopped is ended and the second restart mode which restarts the image forming process of the executed job which has been temporarily stopped after the post-processing of the arbitrary copy of the executed job is ended and after the image forming process of all copies of the stand-by job which is being executed while the image forming process of the executed job is temporarily stopped is ended on the LCD 91. Further, the operation display unit 90 realizes a function as a restart selecting unit which outputs the operation signal indicating the selecting instruction for selecting the first restart mode or the second restart mode based on the screen to the control unit 110.

In such way, the selecting instruction for selecting either one of the first restart mode and the second restart mode can be accepted. Therefore, the condition for restarting the image forming process of the job which is being executed according to the request of a user can be set, and flexibility of the control is improved.

Next, each unit of the printer controller 1b will be described.

The printer controller 1b comprises a controller control unit 11b, a DRAM control IC 12b, an image memory 13b and a LANIF 14b.

The controller control unit 11b integrally controls the operations of each unit, and realizes a function to distribute the data input from a user terminal PC to the body control unit 1a as a job via the LANIF 14a.

The DRAM control IC 12b controls the storing of the data received by the LANIF 14b in the image memory 13b and the reading of the data from the image memory 13b. Further, the DRAM control IC 12b is connected with the DRAM control IC 160 of the image control unit 100 by a PCI (Peripheral Components Interconnect) bus, and reads the data of the print object from the image memory 13b and outputs the data to the DRAM control IC 160 according to the instruction from the controller control unit 11b.

The image memory 13b is constituted of a DRAM and temporarily stores the input data.

The LANIF 14b is a communication interface such as the NIC (Network Interface Card), the modem or the like to connect the printer controller 1b with the network N, and receives the data of print object from a user terminal PC via the network N. The received data is output to the DRAM control IC 12b.

The post-processing unit 2 is provided with a carrying unit or the like such as a carrying roller or the like to carry the recording medium to various types of post-processing units such as the punching unit, the stapling unit, the folding unit, the sheet-cutting unit, the cutting unit and the like, and each unit of the post-processing unit 2 is integrally controlled by the post-processing control unit 400.

The post-processing control unit 400 carries the recording medium P to a predetermined post-processing unit along the carrying passage, carries out a predetermined post-processing for the recoding medium P by controlling the driving of each unit, and carries out the control to eject the recording medium P on a predetermined tray according to the instruction signal of the post-processing which is input from the control unit 110 via the print control unit 300.

Next, the operation of the first embodiment will be explained.

Figure 3:
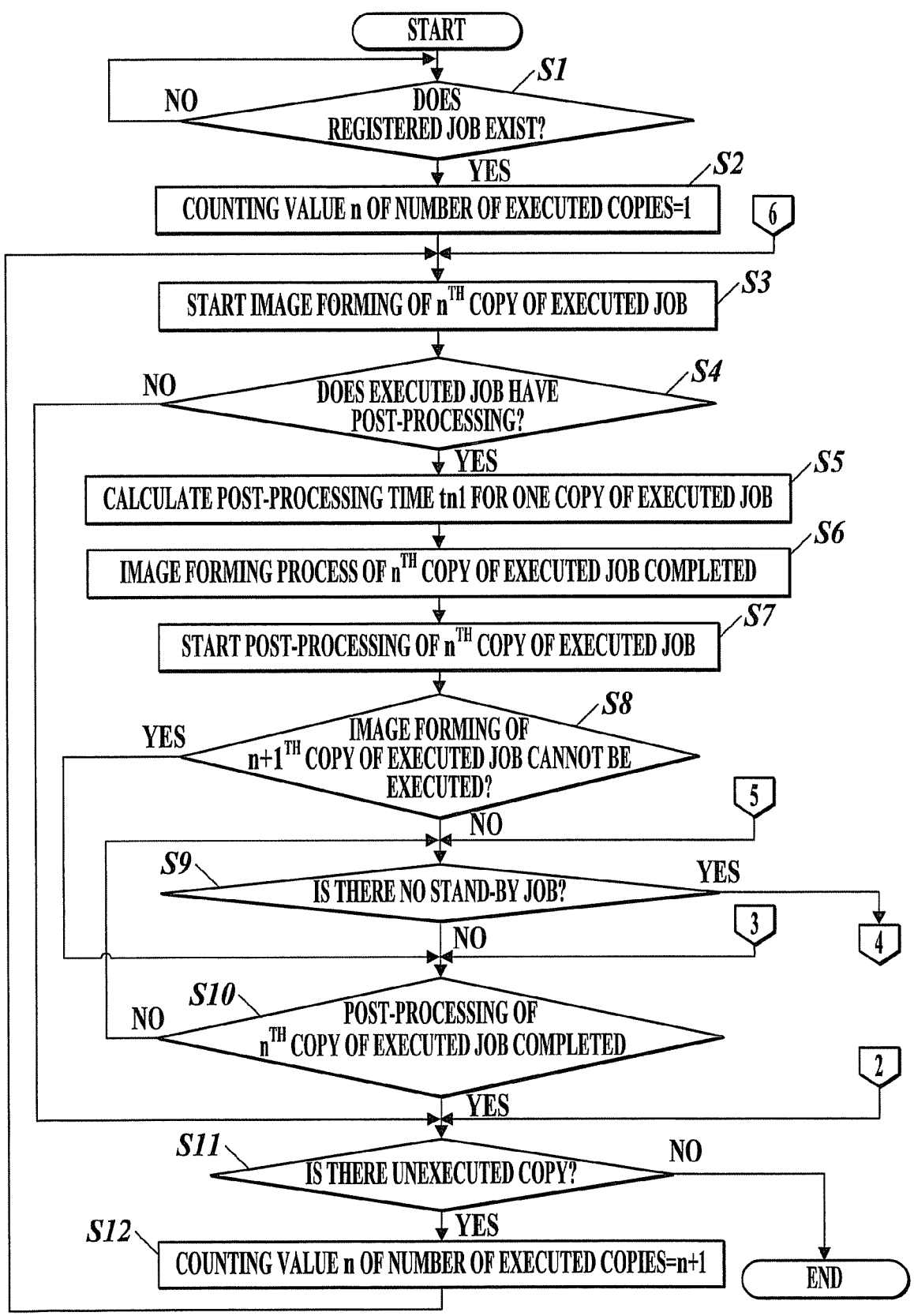
FIG. 3 is a flowchart of a job execution process according to the first embodiment.
Figure 4:
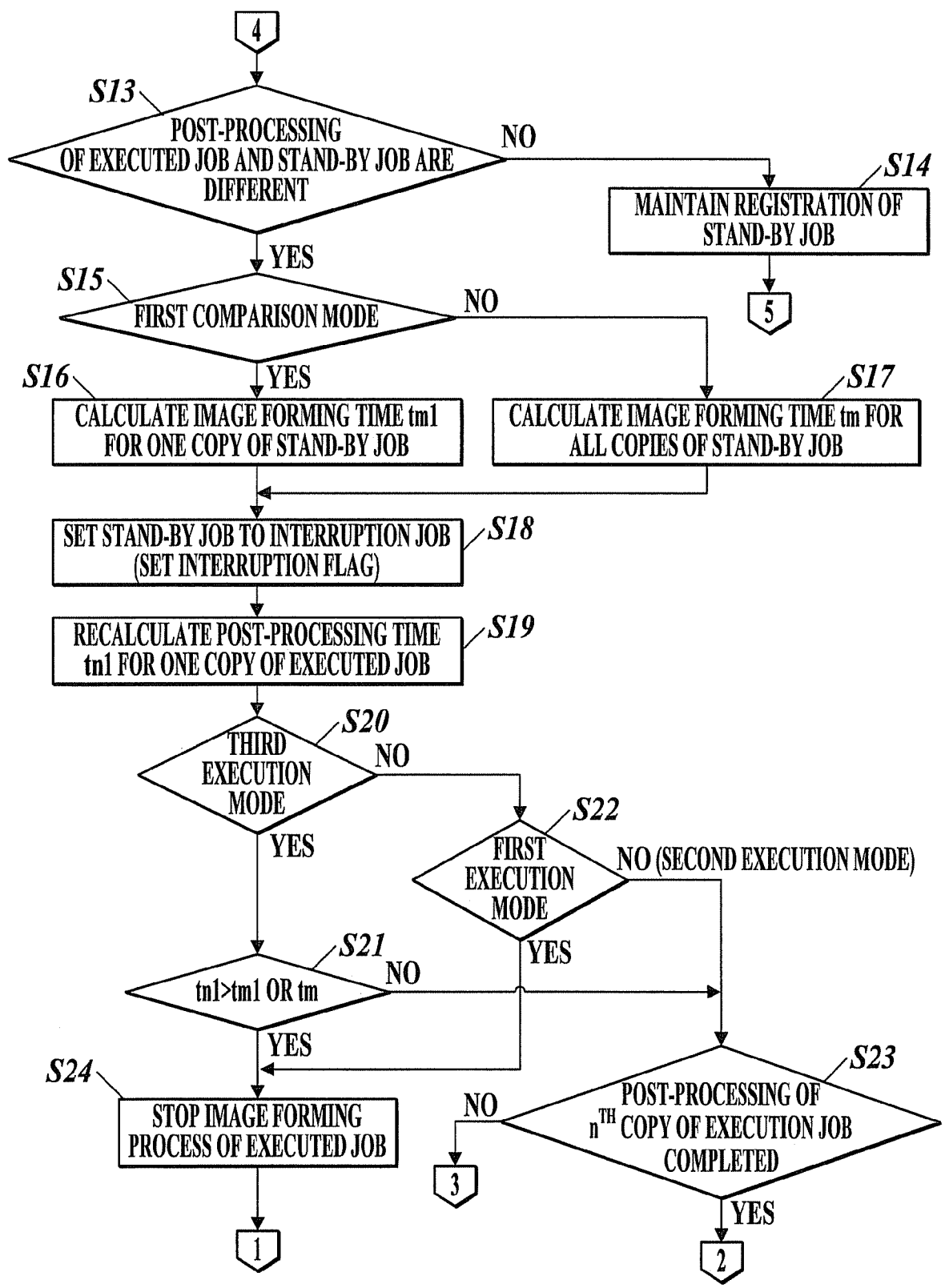
FIG. 4 is a flowchart of the job execution process according to the first embodiment (continuation from FIG. 3)
Figure 5:
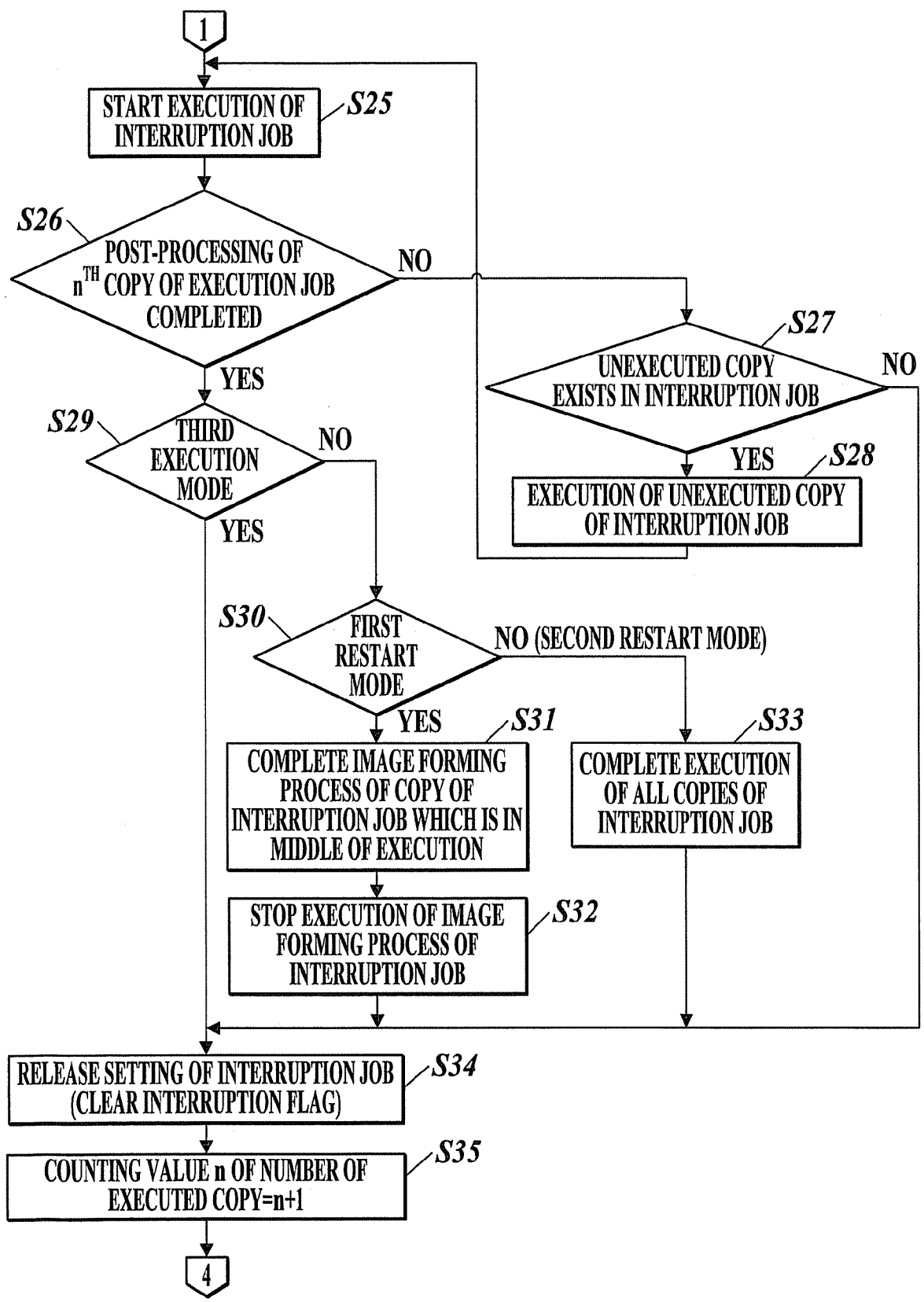
FIG. 5 is a flowchart of the job execution process according to the first embodiment (continuation from FIG. 4)

FIGS. 3, 4 and 5 show a flowchart of the job execution process in the first embodiment.

The job execution process shown in FIGS. 3, 4 and 5 is executed in the control unit 110 based on the job execution program and various types of modes and various types of data accepted by the operation display unit 90.

The control unit 110 determined whether the registered job exists or not (step S1). When the control unit 110 determines that the registered job does not exist (step S1; No), the control unit 110 returns to step S1 and waits till when there is a registered job.

When the control unit 110 determined that the registered job exists (step S1; Yes), the control unit 110 sets the registered job which is registered at the very top of the job queue as the executed job and initializes the counting value n of the number of the executed copy which counts the number of copies executed in the executed job to 1 (step S2), and starts the execution of the image forming process of the $n^{th}$ copy of the executed job (step S3).

The control unit 110 determines whether the post-processing exists or not by referring to the job data of the executed job (step S4). When the control unit 110 determines that the post-processing does not exist (step S4; No), the process proceeds to step S11.

When the control unit 110 determines that the executed job has the post-processing (step S4; Yes), the control unit 110 calculates the time (tn1) needed for the post-processing of one copy which is the time needed from the start to the end of the post-processing of one copy of the executed job based on the job data of the executed job (step S5).

When the image forming process of the $n^{th}$ copy of the executed job is completed (step S6), the control unit 110 starts the execution of the post-processing of the $n^{th}$ copy (step S7) and determines whether the image forming process of the $n+1^{th}$ copy can be executed or not, that is, whether the post-processing of the $n^{th}$ copy can be executed in parallel with the image forming process of the $n+1^{th}$ copy or not (step S8).

In a case where the time in which the image forming process of the $n+1^{th}$ copy being stopped during the post-processing of the $n^{th}$ copy of the execution is short or where there is no need to stop the image forming process in step S8, it can be determined that the image forming process of the $n+1^{th}$ copy can be executed. For example, this situation is a case in which the post-processing of the executed job is to sort or to carryout an off-set paper ejection for the group output or the like.

When the control unit 110 determines that the image forming process of the $n+1^{th}$ copy of the executed job can be executed (step S8; Yes), the process proceeds to step S10.

When the control unit 110 determines that the image forming process of the $n+1^{th}$ copy of the executed job cannot be executed (step S8; No), the control unit 110 determines whether the stand-by job does not exist or not (step S9).

When the control unit 110 determines that the stand-by job does not exist (step S9; No), the control unit 110 determines whether the post-processing of the $n^{th}$ copy of the execution job is completed or not (step S10). When the control unit 110 determines that the post-processing of the $n^{th}$ copy of the execution job is not competed (step S10; No), the process returns to step S9.

After step S4; No, after step S10 which is after step S8; No, after the after-mentioned step S23; Yes, or when the control unit 110 determines that the post-processing of the $n^{th}$ copy of the executed job is competed (step S10; Yes), the control unit 110 determines whether the unexecuted copy exists in the executed job or not (step S11).

When the control unit 110 determines that the unexecuted copy exists in the executed job (step S11; Yes), the control unit 110 adds 1 to the counting value n of the number of the executed copy (step S12), and the process returns to step S3.

When the control unit 110 determines that the unexecuted copy does not exist in the executed job (step s11; No), the process is ended.

When the control unit 110 determines that the stand-by job exists (step S9; Yes), the control unit 110 determines whether the post-processing of the executed job and the post-processing of the stand-by job of the job queue are different or not (step S13).

The determination of whether the post-processing of the executed job and the stand-by job are different or not which is carried out in step S13 is to determine whether the recording mediums in which the image forming process is ended mix with one another or not or bump into one another or not on the carrying passage by determining whether the passage of the post-processing of the executed job and the passage of the post-processing of the stand-by job do not overlap or not and whether the type (for example, a punching, a stapling, a folding, a sheet-cutting, a cutting and the like) of the post-processing of the execution job and the type of the post-processing of the stand-by job are different or not.

In such way, the conflict of the post-processing of the executed job and the post-processing of the stand-by job to be executed by interrupting during the post-processing of the executed job can be prevented by carrying out the determination of step S13.

When the control unit 110 determines that the post-processing of the executed job and the post-processing of the stand-by job are not different (step S13; No), the control unit 110 maintains the registered condition of the stand-by job (step S14), and the process returns to step S9.

When the control unit 110 determines that the post-processing of the executed job and the post-processing of the stand-by job are different (step S13; Yes), the control unit 110 determined whether the first comparison mode is selected or not (step S15).

When the control unit 110 determines that the first comparison mode is selected (step S15; Yes), the control unit 110 calculates the time (tm1) needed for the image forming process of one copy of the stand-by job based on the job data of the stand-by job which is determined to have different post-processing compared to the executed job in step S13 (step S16).

When the control unit 110 determines that the first comparison mode is not selected (step S15; No), the control unit 110 determines that the second comparison mode is selected and calculates the time (tm) needed for the image forming process of all copies of the stand-by job based on the job data of the stand-by job which is determined to have different post-processing compared to the executed job in step S13 (step S17).

After step S16 or step S17, the control unit 110 sets an interruption flag in the stand-by job and sets the stand-by job as an interruption job (step S18), and recalculates the post-processing time tn1 of the $n^{th}$ copy of the executed job (step S19).

By subtracting the time between the starting time of the post-processing of the $n^{th}$ copy and the setting time of the interruption flag from the post-processing time tn1 of one copy which is calculated in step S5 in step S19, rest of the post-processing time of the $n^{th}$ copy which is being executed as the substantive time needed for the post-processing of the nth copy is calculated.

The control unit 110 determines whether the third execution mode is selected or not (step S20). When the control unit 110 determines that the third execution mode is selected (step S20; Yes), the post-processing time (tn1) of the $n^{th}$ copy of the executed job which is calculated in step S19 and the time needed for the image forming process of one copy of the stand-by job (tm1) which is calculated in step S16 are compared when the first comparison mode is selected and whether the post-processing time (tn1) of the $n^{th}$ copy of the executed job is greater than the time needed for the image forming process of one copy of the stand-by job (tm1) which is calculated in step S16 or not is determined. On the other hand, the post-processing time (tn1) of the $n^{th}$ copy of the executed job which is calculated in step S19 and the time (tm) needed for the image forming process of all copies of the stand-by job which is calculated in step S17 are compared when the second comparison mode is selected and whether the post-processing time (tn1) of the $n^{th}$ copy of the executed job is greater than the time (tm) needed for the image forming process of all the copies of the stand-by job which is calculated in step S17 ore not is determined (step S21).

When the control unit 110 determines that the third execution mode is not selected (step S20; No), the control unit 110 determines whether the first execution mode is selected or not (step S22).

When the control unit 110 does not determined that the post-processing time (tn1) of the $n^{th}$ copy of the executed job is greater than the time (tm1) needed for the image forming process of one copy of the stand-by job which is calculated in step S16 or that the post-processing time (tn1) of the $n^{th}$ copy of the executed job is greater than the time (tm) needed for the image forming process of all copies of the stand-by job which is calculated in step S17 (step S21; No), or when the control unit 110 does not determined that the first execution mode is not selected and when it is determined so that the second execution mode is selected (step S22; No), the control unit 110 determines whether the post-processing of the $n^{th}$ copy of the executed job is competed or not (step S23).

When the control unit 110 determines that the post-processing of the $n^{th}$ copy of the executed job is competed (step S23; Yes), the process returns to step S11. When the control unit 110 determines that the post-processing of the nth copy of the executed job is not competed (step S23; No), the process returns to step S10.

When the control unit 110 determines that the post-processing time (tn1) of the $n^{th}$ copy of the executed job is greater than the time (tm1) needed for the image forming process of one copy of the stand-by job which is calculated in step S16 or that the post-processing time (tn1) of the $n^{th}$ copy of the executed job is greater than the time (tm) needed for the image forming process of all copies of the stand-by job which is calculated in step S17 (step S21; Yes), or when the control unit 110 determines that the first execution mode is selected (step S22; Yes), the post-processing of the arbitrary copy of the executed job, that is either one of the copies (nth copy) in the executed job is executed and the control unit 110 stops the image forming process of the executed job in a state where the image forming process of the $n^{th}$ copy is completed (step S24), and the process proceeds to step S25.

After the image forming process of the executed job is temporarily stopped, the control unit 110 starts the execution of the interruption job (step S25) and determines whether the post-processing of the $n^{th}$ copy of the executed job is completed or not (step S26).

When the control unit 110 determines that the post-processing of the $n^{th}$ copy of the executed job is not competed (step S26; No), the control unit 110 determines whether there is unexecuted copy in the interruption job or not (step S27).

When the control unit 110 determines that there is unexecuted copy in the interruption job (step S27; Yes), the control unit 110 starts the execution of the unexecuted copy of the interruption job (step S28), and the process returns to step S25. When the control unit 110 determines that there is no unexecuted copy in the interruption job (step S27; No), the process proceeds to step S34.

When the control unit 110 determines that the post-processing of the $n^{th}$ copy of the executed job is completed (step S26; Yes), the control unit 110 determines whether the third execution mode is selected or not (step S29). When the control unit 110 determines that the third execution mode is selected (step S29; Yes), the process proceeds to step S34.

When it is determined that the third execution mode is not selected (step S29; Yes), the control unit 110 determines whether the first restart mode is selected or not (step S30).

When the control unit 110 determines that the first restart mode is selected (step S30; Yes), the control unit 110 completes the image forming process of a copy of the interruption job which is in the middle of the execution (step S31) and temporarily stops the image forming process of the interruption job (step S32), and the process proceeds to step S34.

When the control unit 110 determines that the first restart mode is not selected (step S30; No), the control unit 110 determines so that the second restart mode is selected and completes the image forming process of all copies of the interruption job (step S33), and the process proceeds to step S34.

After step S27; No, after step S29; Yes, after step S32 or after step S33, the control unit 110 clears the interruption flag of the interruption job, releases the setting of the interruption job (step S34), and adds 1 to the counting value n of the number of executed copies (step S35), and the process returns to step S3.

According to the first embodiment, the image forming process of the stand-by job can be executed while the post-processing of the executed job is being executed according to the result of comparing the time needed for the post-processing of the executed job and the time needed for the image forming process of the stand-by job. Therefore, the temporary stop time of the image forming operation in the image forming apparatus can be reduced, the image forming operation can be efficient and can be speeded-up, and the productivity can be improved.

Particularly, the execution order of the image forming process can be changed for each copy when the registered jobs are executed one copy by one copy. Therefore, the temporary stop time of the image forming operation in the image forming apparatus can be reduced even more, and the negative effect in which the image forming process of a copy following an arbitrary copy of the executed job being on stand-by can be prevented.

Moreover, the image forming process of the executed job which has been temporarily stopped can be restarted after the post-processing of the arbitrary copy of the executed job is ended and after the image forming process of the stand-by job (all of the copies or an arbitrary copy) which is executed while the image forming process of the executed job is temporarily stopped is ended. Therefore, the conflict of the image forming process of the executed job and the image forming process of the stand-by job can be prevented.

Second Embodiment

Hereinafter, the second embodiment of the present invention will be described with reference to the drawings.

First, the structure will be described.

The cross sectional diagram of the image forming apparatus A according to the second embodiment is similar to the first embodiment. Therefore, diagrams and descriptions are omitted.

The control block diagram of the image forming apparatus A is approximately similar to the first embodiment except that the job dividing process program, the job restructuring program and the job execution program are stored in the non-volatile memory 120 in the second embodiment instead of the job registration program, the job execution program and various types of modes input from the operation display unit 90 which are stored in the non-volatile memory 120 in the first embodiment and that the control unit 110 of the second embodiment divides the job in each copy when the job is registered, registers the each divided copy as independent jobs (job dividing process), changes the registration order based on the time needed for post-processing of the job of the each divided job and the time needed for the image forming process (job restructuring process), and orderly executes the job according to the registration order (job execution process) Therefore, the control block diagram of the image forming apparatus A is omitted from the diagrams and, other descriptions are also omitted.

That is, the control unit 110 realizes a function as a dividing unit, a divided job comparing unit and a registration control unit by executing the job dividing process program, the job restructuring process program and the job execution program which are stored in the non-volatile memory 120 in co-operation with the RAM 130 or the like.

The job dividing process program of the second embodiment is a program to generate a plurality of divided jobs by dividing the accepted job as jobs in which each copy is made to be the independent jobs and registers the divided jobs in the job queue when the job is accepted and registered in a case where the after mentioned division registration mode which is accepted by the operation display unit 90 is instructed.

The division registration mode is a mode which generates divided jobs by dividing the job having a plurality of copies into each copy to register. The operation display unit 90 accepts the instruction of the division registration mode from the screen displayed on the LCD 91 or from various types of keys, and outputs the operations signal indicating the operation instruction to the control unit 110.

The job restructuring process program of the second embodiment is a program to change the registration order of the $2m^{th}$ divided job according to the result of comparing the time (tn1) needed for the post-processing of the divided job (the $1n^{th}$ divided job) which is generated by dividing one job and which is registered in the job queue and the time (tm1) needed for the image forming process of the divided job (the $2m^{th}$ divided job) which is generated by dividing another job and which is registered in the job queue.

The job execution process program of the second embodiment is a program to orderly execute the divided jobs which are registered in the job queue.

Figure 6:
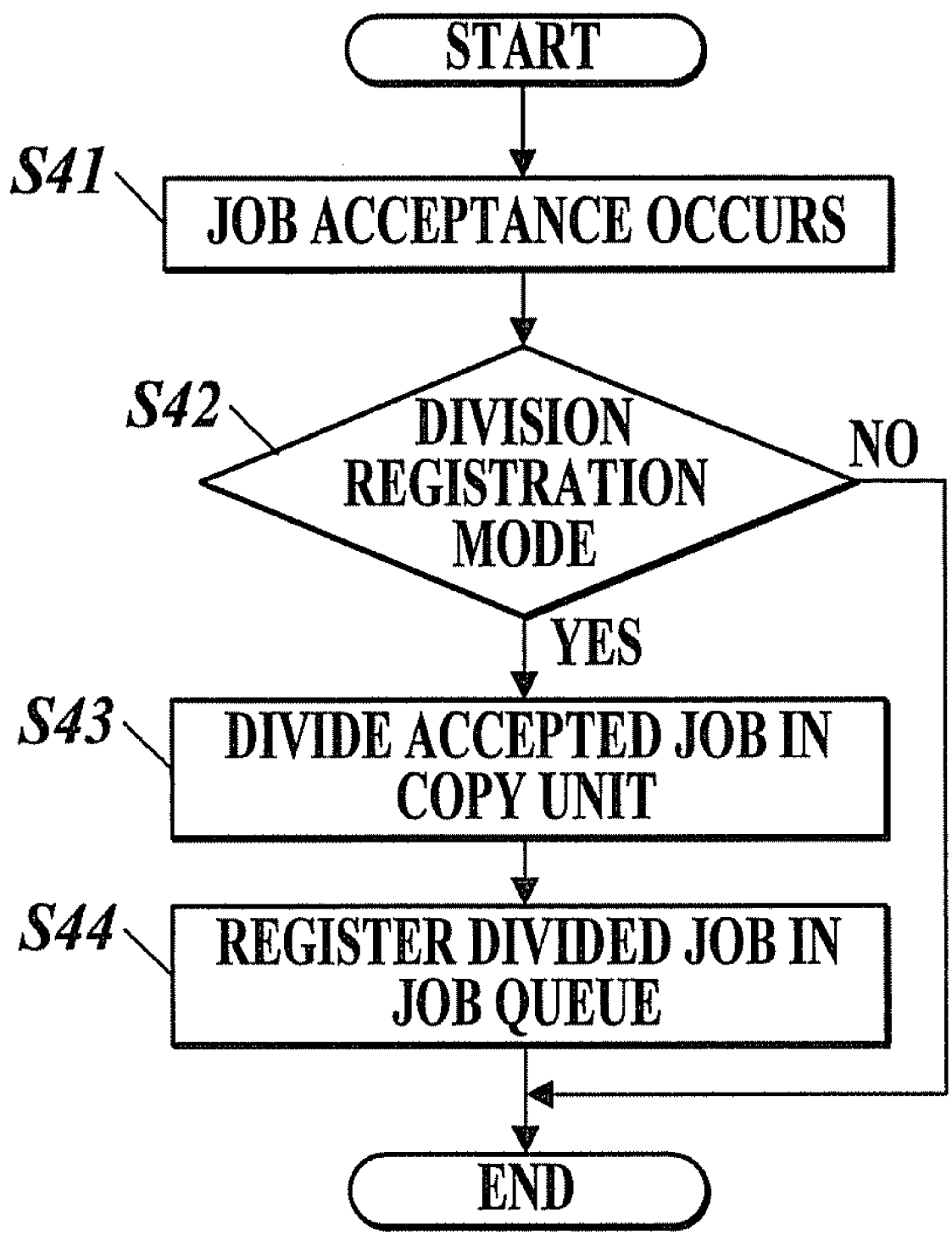
FIG. 6 is a flowchart of a job dividing process according to the second embodiment.
Figure 7:
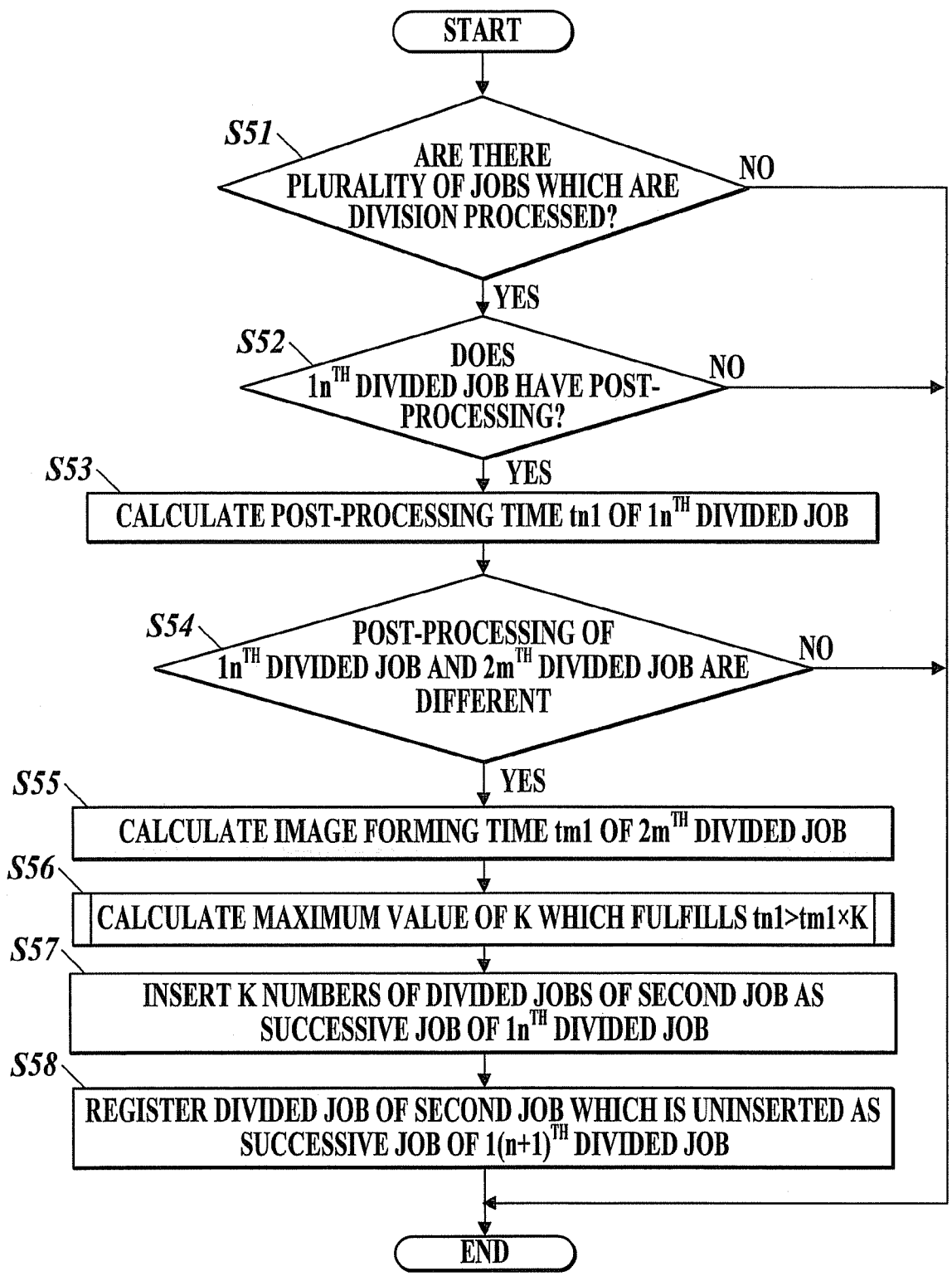
FIG. 7 is a flowchart of a job restructuring process according to the second embodiment.
Figure 8:
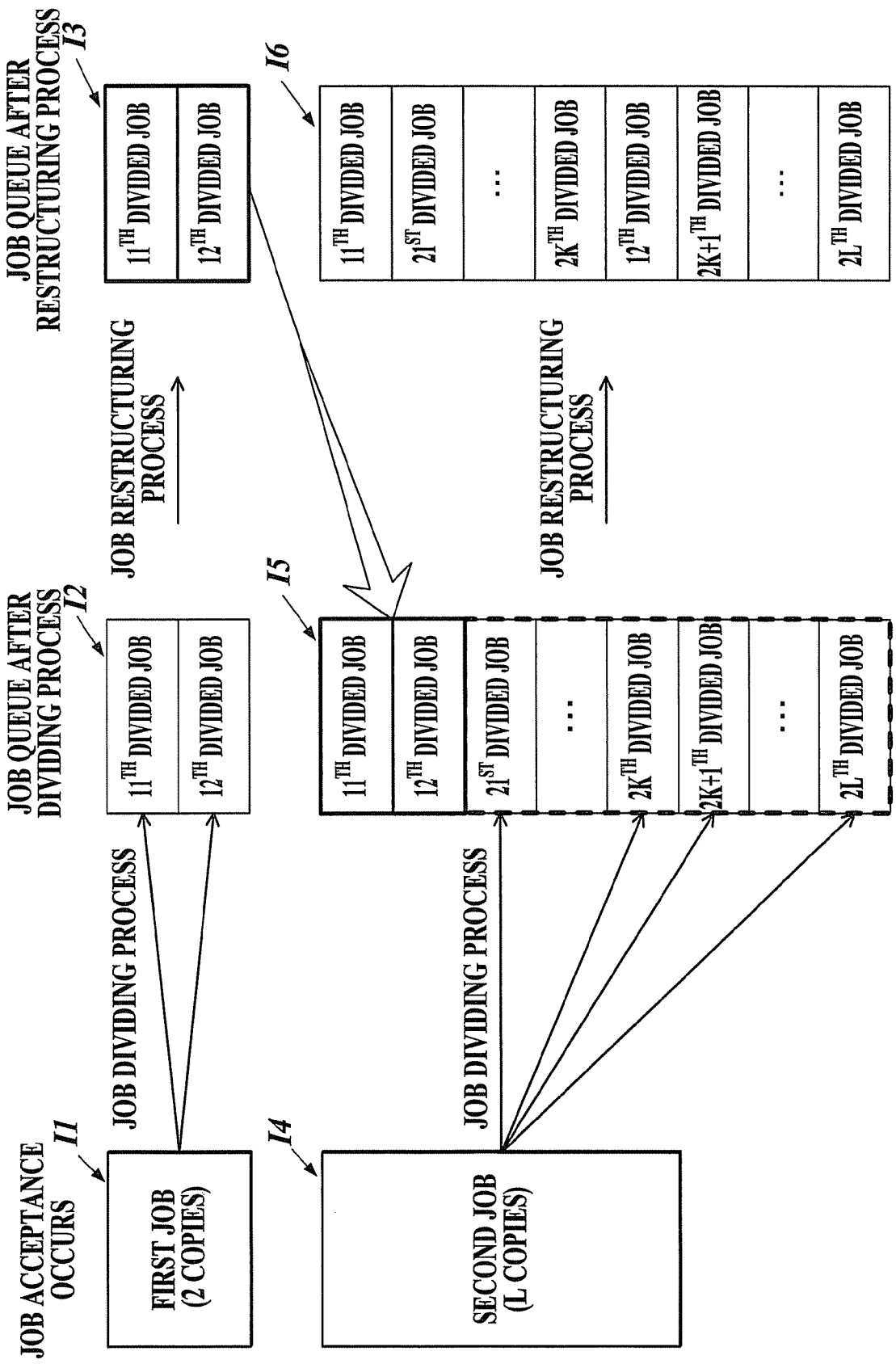
FIG. 8 shown an image diagram of a registration operation of a job based on FIGS. 6 and 7.

FIG. 6 shows a flowchart of the job dividing process in the second embodiment, FIG. 7 shows a flowchart of the job restructuring process in the second embodiment, and FIG. 8 shows an image diagram of the registration operation of the job based on FIGS. 6 and 7.

Here, the operations shown in FIGS. 6 and 7 are to be executed in the control unit 110 based on the job dividing process program, the job restructuring process program, other various types of data and the like.

First, the job dividing process will be described.

When the acceptance of a job occurs (step S41), the control unit 110 determines whether the division registration mode is instructed or not (step S42).

When the control unit 110 determines that the division registration mode is not instructed (step S42; No), the process is ended.

When the control unit 110 determines that the division registration mode is instructed (step S42; Yes), the control unit 110 divides the accepted job in copy units (step S43) and registers each copy of the job which is divided as the divided jobs in the job queue (step S44), and the process is ended.

The job dividing process of FIG. 6 will be described so as to correspond to the image diagram shown in FIG. 8.

For example, in a case where the division registration mode is instructed when the acceptance of the first job which is a job for 2 copies shown in FIG. 8 occurs (I1 of FIG. 8), the first job is divided in copy units, the $11^{th}$ divided job and the $12^{th}$ divided job are generated as the divided jobs, and the 11$^{th}$ divided job and the 12$^{th}$ divided job are registered in the job queue (I2 of FIG. 8).

Moreover, in a case where the division registration mode is instructed when the acceptance of the second job which is a job for L copies shown in FIG. 8 occurs (I4 of FIG. 8) after the job dividing process and the job restructuring process of the first job are ended, the second job is divided in copy units, the 2L$^{th}$ divided job is generated from the 21$^{st}$ divided job as the divided job, and the jobs from the 21$^{st}$ divided job to the 2L$^{th}$ divided job are registered at the very end of the job queue (I5 of FIG. 8).

Next, the job restructuring process will be described.

The control unit 110 determines whether there are a plurality of jobs in which the job dividing process is carried out in the job queue or not (step S51).

For example, when the control unit 110 determines that only one job in which the dividing process is carried out is register in the job queue (step S51; No) similar to the case shown in FIG. 8 where the dividing process is only carried out for the first job (I2 of FIG. 8), the process is ended.

For example, when the control unit 110 determines that a plurality of the jobs in which the dividing process is carried out are registered in the job queue (step S51; Yes) similarly to the case shown in FIG. 8 where the dividing process is carried out for both the first job and the second job (I5 of FIG. 8), the control unit 110 determines whether the divided job of the n$^{th}$ copy (the 1n$^{th}$ divided job) of the job (the first job) in which the dividing process is carried out in advance has post-processing or not (step S52).

When the control unit 110 determines that the 1n$^{th}$ divided job does not have the post-processing (step S52; No), the process is ended.

When the control unit 110 determines that the 1n$^{th}$ divided job has the post-processing (step S52; Yes), the control unit 110 calculates the post-processing time tn1 of the 1n$^{th}$ divided job based on the job data of the 1n$^{th}$ divided job (step S53).

The control unit 110 determines whether the post-processing of the 1n$^{th}$ divided job and the post-processing of the m$^{th}$ copy of the divided job of the second job (the 2m$^{th}$ divided job) are different or not (step S54).

In step S54, the determination of whether the post-processing of the 1n$^{th}$ divided job and the 2m$^{th}$ divided job are different or not is to determine whether the recording mediums in which the image forming process is ended mix with one another or not or bump into one another or not on the carrying passage by determining whether the passage of the post-processing of the 1n$^{th}$ divided job and the passage of the post-processing of the 2m$^{th}$ divided job do not overlap or not and whether the type of the post-processing (for example, the punching, the stapling, the folding, the sheet-cutting, the cutting and the like) of the 1n$^{th}$ divided job and the type of the post-processing of the 2m$^{th}$ divided job are different or not.

When the control unit 110 determines that the post-processing of the 1n$^{th}$ divided job and the 2m$^{th}$ divided job are the same (step S54; No), the process is ended.

When the control unit 110 determines that the post-processing of the 1n$^{th}$ divided job and the 2m$^{th}$ divided job are different (step S54; Yes), the control unit 110 calculates the image forming processing time tm1 of the 2m$^{th}$ divided job based on the job data of the 2m$^{th}$ divided job (step S55).

The control unit 110 calculates the maximum value of K (K is a positive integer) which fulfills the condition in which the image forming process time tm1 of K numbers of the 2m$^{th}$ divided jobs be not greater than the post-processing time tn1 of the 1n$^{th}$ divided job (step S56). Further, the control unit 110 inserts K numbers of the divided job of the second job (jobs from the 21$^{st}$ divided job to the 2K$^{th}$ divided job) as the successive jobs of the 1n$^{th}$ divided job (step S57).

The control unit 110 registers the uninserted divided job (jobs from the 2K+1$^{th}$ divided job to the 2L$^{th}$ divided job) among the divided jobs of the second job as the successive jobs of the 1(n+1)$^{th}$ divided job (step S58), and the process is ended.

The job restructuring process shown in FIG. 7 will be described so as to correspond with the image diagram shown in FIG. 8.

For example, when there are 2 jobs in which the dividing process is carried out (I5 of FIG. 8) and when the 11$^{th}$ divided job as the 1n$^{th}$ divided job has the post-processing, the post-processing time tn1 of the 11$^{th}$ divided job is calculated. Then, when it is determined that the post-processing of the 11$^{th}$ divided job and the post-processing of the 21$^{st}$ divided job of the divided jobs which is the top of the second job are different, the image forming process time tm1 of the 21$^{st}$ divided job is calculated. The maximum value of K (K is a positive integer) which fulfills the condition in which the image forming process time tm1 of the K numbers of the 21$^{st}$ divided job be less than the post-processing time tn1 of the 11$^{th}$ divided job is calculated, the K numbers of the divided jobs of the second job which are the jobs from the 21$^{st}$ divided job to the 2K$^{th}$ divided job are inserted as the successive jobs of the 11$^{th}$ divided job, the jobs from the 2K+1$^{th}$ divided job to the 2L$^{th}$ divided job are inserted and are registered as the successive jobs of the 12$^{th}$ divided job (I6 of FIG. 8), and the process is ended.

Figure 9:
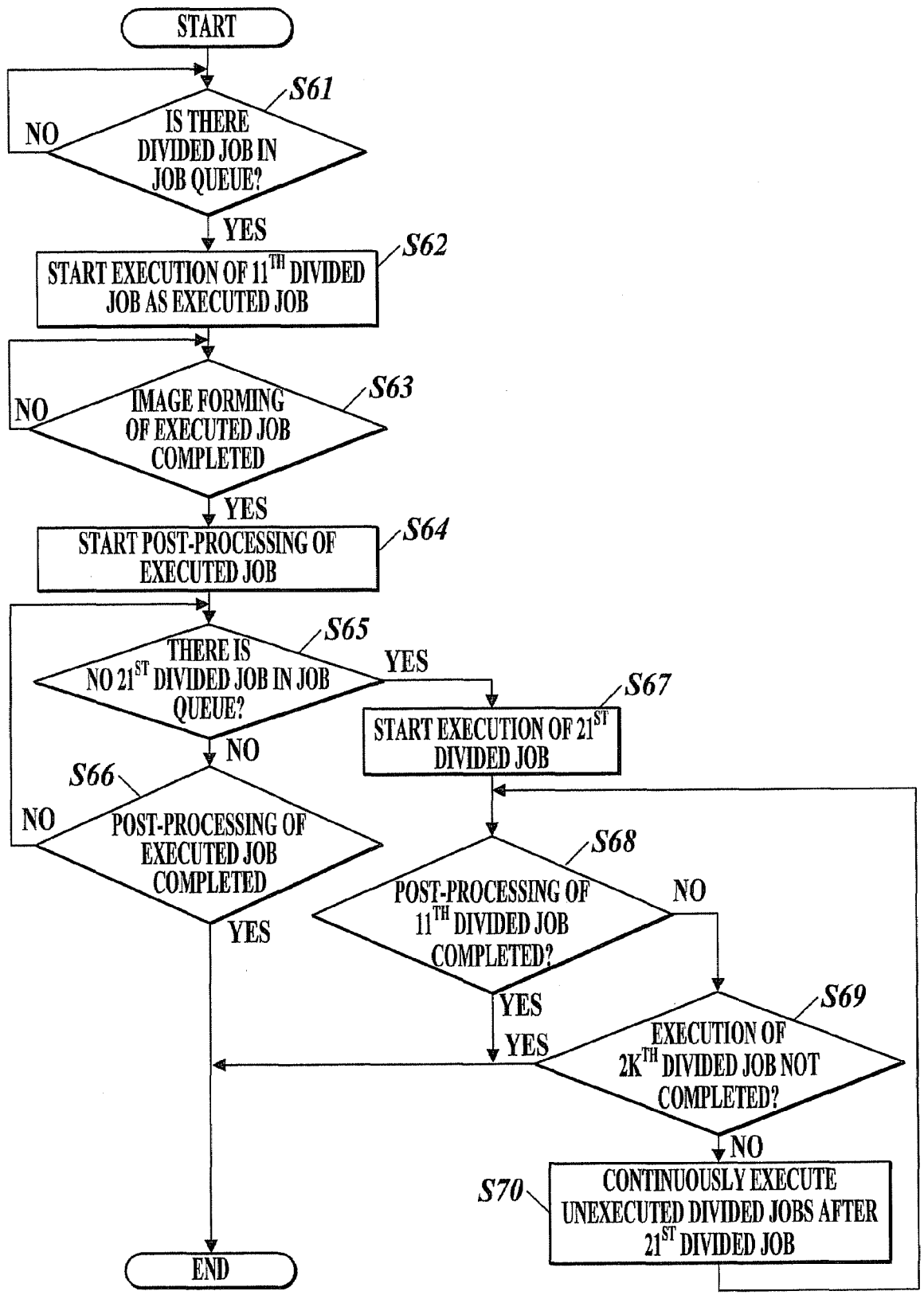
FIG. 9 is a flowchart of a job execution process according to the second embodiment.

FIG. 9 shows a flowchart of the job execution process in the second embodiment.

Here, the operations shown in FIG. 9 are executed in the control unit 110 based on the job execution process program, other various types of data and the like. Further, the job execution process is a process which can be executed in parallel with the job dividing process and the job restructuring process.

The control unit 110 determines whether the divided jobs are registered in the job queue or not (step S61). When the control unit 110 determines that the divided jobs are not registered (step S61; No), the process returns to Step S61.

When the control unit 110 determines that the divided jobs are registered in the job queue (step S61; Yes), the control unit 110 starts the execution of the image forming process of the divided job which is registered at the top of the job queue (for example, the 11$^{th}$ divided job of the job queue of I6 in FIG. 8, hereinafter, the description will be given by focusing on the 11$^{th}$ divided job) as the executed job (step S62).

The control unit 110 determines whether the image forming process of the executed job (the 11$^{th}$ divided job) is competed or not (step S63). When the control unit 110 determines that the image forming process is not completed (step S63; No), the control unit 110 waits till the image forming process is completed (returns to step S63).

When the control unit 110 determines that the image forming process of the executed job (the 11$^{th}$ divided job) is completed (step S63; Yes), the control unit 110 starts the post-processing of the executed job (step S64).

The control unit 110 starts the post-processing of the executed job (the 11$^{th}$ divided job), and also determines whether a divided job (the 21$^{st}$ divided job) generated by the job dividing process of the job which is different from the executed job exists or not as the successive job of the job queue (step S65).

When the control unit 110 determines that the 21$^{st}$ divided job as a successive job of the executed job (the 11$^{th}$ divided job) does not exist in the job queue (step S65; No), the control unit 110 determines whether the post-processing of the executed job (the 11$^{th}$ divided job) is completed or not (step S66). When the control unit 110 determines that the post-processing is not completed (step S66; No), the process returns to step S65.

When the control unit 110 determines that the post-processing of the executed job (the 11$^{th}$ divided job) is completed (step S66; Yes), the control unit 110 ends the job execution process which focuses on the executed job (the 11$^{th}$ divided job) and proceeds to the job execution process of other divided job (for example, the 12$^{th}$ divided job) registered in the job queue.

When the control unit 110 determines that the 21$^{st}$ divided job exists as the successive job of the executed job (the 11$^{th}$ divided job) in the job queue (step S65; Yes), the control unit 110 orderly starts the execution of the divided jobs which are inserted as the successive jobs of the executed job (the 11$^{th}$ divided job) in the job restructuring process including the 21$^{st}$ divided job (step S67), and the process proceeds to step S69.

When the control unit 110 determines that the execution of the image forming process of all the divided jobs (jobs from the 21$^{st}$ divided job to the 2K$^{th}$ divided job) which are inserted as the successive jobs of the executed job in the job restructuring process is not completed (step S69; No), the control unit 110 continuously executes the divided jobs following the 21$^{st}$ divided job which is unexecuted (step S70), and the process returns to step S69.

When the control unit 110 determines that the execution of the image forming process of all the divided jobs (job from the 21$^{st}$ divided job to the 2K$^{th}$ divided job) which are inserted as the successive jobs of the executed job in the job restructuring process is completed (step S69; Yes), the process proceeds to step S68.

When the control unit 110 determines that the post-processing of the executed job (the 11$^{th}$ divided job) is completed (step S68; Yes), the control unit 110 ends the job execution process which focuses on the executed job (the 11$^{th}$ divided job) and proceeds to the job execution process of other divided job (for example, the 12$^{th}$ divided job) which is registered in the job queue.

When the control unit 110 determines that the post-processing of the executed job (the 11$^{th}$ divided job) is not completed (step S68; No), the control unit 110 waits till the post-processing of the 11$^{th}$ divided job is completed.

According to the second embodiment, a plurality of divided jobs can be generated by dividing the jobs as an independent job for each copy, and the registration order of the divided jobs which are generated by dividing another job can be changes according to the result of comparing the time needed for the post-processing of the divided job which is generated by dividing one job with the time needed for the image forming process of the divided job which is generated by dividing another job. Therefore, one copy can be treated as one job, and the job execution control can be simplified. Thus, the temporary stop time of the image forming operation in the image forming apparatus can be reduced, the image forming operation can be efficient and can be speeded-up, and the productivity can be improved.

The present invention is not limited to the description given in the above first and second embodiments, and can be arbitrarily changed within the scope of the present invention.

According to an aspect of the preferred embodiments of the present invention, there is provided an image forming apparatus which registers jobs in an order of acceptance of the jobs and which carries out an image forming process and a post-processing for a recording medium according to a content of the registered jobs comprising a comparing unit to compare a time needed for a post-processing of a first job which is being executed with a time needed for an image forming process of a second job which is on stand-by and which is registered, and a control unit to execute the image forming process of the second job which is on stand-by after an image forming process of the first job which is being executed is ended and while the post-processing of the first job is being executed according to a comparison result of the comparing unit.

In the image forming apparatus, the image forming process of the second job which is on stand-by can be executed while the post-processing of the first job is being executed according to the result of comparing the time needed for the post-processing of the first job which is being executed with the time needed for the image forming process of the second job which is on stand-by and which is registered. Therefore, the temporary stop time of the image forming operation in the image forming apparatus can be reduced, the image forming operation can be efficient and can be speeded-up, and the productivity can be improved.

Preferably, the control unit executes the image forming process of the second job when the comparison result of the comparing unit shows that the time needed for the post-processing of the first job is longer than the time needed for the image forming process of the second job.

In the image forming apparatus, the image forming process of the second job can be executed while the post-processing of an executed job is being executed when the time needed for the post-processing of the first job is longer than the time needed for the image forming process of the second job. Therefore, the temporary stop time of the image forming operation of the executed job in the image forming apparatus can be reduced.

Preferably, the control unit does not execute the image forming process of the second job when the comparison result of the comparing unit shows that the time needed for the post-processing of the first job is less than or equal to the time needed for the image forming process of the second job.

In the image forming apparatus, the image forming process of the second job can be made not to be executed when the time needed for the post-processing of the first job is less than or equal to the time needed for the image forming process of the second job.

Preferably, the first job and the second job are jobs for one copy or a plurality of copies, the comparing unit compares a time needed for a post-processing of one copy of the first job and a time needed for an image forming process of one copy of the second job, and the control unit executes the second job one copy by one copy and executes the image forming process of the second job by allowing the image forming process of the second job to interrupt while the image forming process of the first job is temporarily stopped by executing a post-processing of an arbitrary copy of the first job, according to the comparison result of the comparing unit.

In the image forming apparatus, the image forming process of the second job can be executed by allowing the image forming process of the second job to interrupt while the image forming process of the first job is being temporarily stopped by executing the post-processing of the arbitrary copy of the first job, according to the result of comparing the time needed for the post-processing of one copy of the first job with the time needed for the image forming process of one copy of the second job, and the execution order of the image forming process can be changed for each copy. Therefore, the temporary stop time of the image forming operation in the image forming apparatus can be reduced, the image forming operation can be efficient and can be speeded-up, and the productivity can be improved.

Preferably, the control unit executes the image forming process of the second job by allowing the image forming process of the second job to interrupt while the image forming process of the first job is temporarily stopped by executing the post-processing of the arbitrary copy of the first job when the comparison result of the comparing unit shows that the time needed for the post-processing of one copy of the first job is longer than the time needed for the image forming process of one copy of the second job.

In the image forming apparatus, the image forming process of the second job can be executed by allowing the image forming process of the second job to interrupt while the image forming process of the first job is being temporarily stopped by executing the post-processing of the arbitrary copy of the first job when the time needed for the post-processing of one copy of the first job is longer than the time needed for the image forming process of one copy of the second job. Therefore, the temporary stop time of the image forming operation of the first job in the image forming apparatus can be reduced.

Preferably, the control unit does not execute the image forming process of the second job by not allowing the image forming process of the second job to interrupt while the image forming process of the first job is temporarily stopped by executing the post-processing of the arbitrary copy of the first job when the comparison result of the comparing unit shows that the time needed for the post-processing of one copy of the first job is less than or equal to the time needed for the image forming process of one copy of the second job.

In the image forming apparatus, the image forming process of the second job can be made not to be executed by not allowing the image forming process of the second job to interrupt while the image forming process of the first job is being temporarily stopped by executing the post-processing of the arbitrary copy of the first job when the time needed for the post-processing of one copy of the first job is less than or equal to the time needed for the image forming process of one copy of the second job. Therefore, a trouble in which the image forming process of the copy which succeeds the arbitrary copy of the first job becomes on stand-by can be prevented.

Preferably, the first job and the second job are jobs for one copy or a plurality of copies, the comparing unit compares a time needed for a post-processing of one copy of the first job with a time needed for an image forming process of all copies of the second job, and the control unit executes the second job one copy by one copy and executes the second job by allowing the second job to interrupt while an image forming process of the first job is temporarily stopped by executing a post-processing of an arbitrary copy of the first job, according to the comparison result of the comparing unit.

In the image forming apparatus, the second job can be executed by allowing the second job to interrupt while the image forming process of the first job is being temporarily stopped by executing the post-processing of the arbitrary copy of the first job according to the result of comparing the time needed for the post-processing of one copy of the first job with the time needed for the image forming process of all copies of the second job.

Preferably, the control unit executes the second job by allowing the second job to interrupt while the image forming process of the first job is temporarily stopped by executing the post-processing of the arbitrary copy of the first job when the comparison result of the comparing unit shows that the time needed for the post-processing of one copy of the first job is longer than the time needed for the image forming process of all copies of the second job.

In the image forming apparatus, the second job can be executed by allowing the second job to interrupt while the image forming process of the first job is being temporarily stopped by executing the post-processing of the arbitrary copy of the first job when the time needed for the post-processing of one copy of the first job is longer than the time needed for the image forming process of all copies of the second job.

Preferably, the control unit does not execute the second job by not allowing the second job to interrupt while the image forming process of the first job is temporarily stopped by executing the post-processing of the arbitrary copy of the first job when the comparison result of the comparing unit shows that the time needed for the post-processing of one copy of the first job is less than or equal to the time needed for the image forming process of all copies of the second job.

In the image forming apparatus, the second job can be made not to be executed by not allowing the second job to interrupt while the image forming process of the first job is being temporarily stopped by executing the post-processing of the arbitrary copy of the first job when the time needed for the post-processing of one copy of the first job is less than or equal to the time needed for the image forming process of all copies of the second job. Therefore, a trouble in which the image forming process of the copy which succeeds the arbitrary copy of the first job becomes on stand-by can be prevented.

Preferably, the image forming apparatus further comprises a comparing object selecting unit to accept a selecting instruction for selecting either one of a first comparison mode and a second comparison mode, wherein the first comparison mode compares the time needed for the post-processing of one copy of the first job with the time needed for the image forming process of one copy of the second job, and the second comparison mode compares the time needed for the post-processing of one copy of the first job with a time needed for an image forming process of all copies of the second job.

In the image forming apparatus, the selecting instruction for selecting either one of the first comparison mode and the second comparison mode can be accepted. Therefore, the comparing objects can be set according to a request of a user, and the flexibility of control can be improved.

Preferably, the image forming apparatus further comprises an execution job selecting unit to accept a selecting instruction for selecting either one of a first execution mode, a second execution mode and a third execution mode, wherein the first execution mode executes the second job by allowing the second job to interrupt while the image forming process of the first job is temporarily stopped by executing the post-processing of the arbitrary copy of the first job, the second execution mode does not execute the second job by not allowing the second job to interrupt while the image forming process of the first job is temporarily stopped by executing the post-processing of the arbitrary copy of the first job, and the third execution mode executes a process of executing the second job by allowing the second job to interrupt while the image forming process of the first job is temporarily stopped by executing the post-processing of the arbitrary copy of the first job, according to a comparison result of the control unit.

In the image forming apparatus, the selecting instruction for selecting either one of the first execution mode, the second execution mode and the third execution mode can be accepted. Therefore, the flexibility of the interruption setting of the order of the job which is to be executed according to a request of a user can be improved.

Preferably, the control unit restarts the image forming process of the first job which has been temporarily stopped when the post-processing of the arbitrary copy of the first job is ended.

In the image forming apparatus, the image forming process of the first job which has been temporarily stopped can be restarted when the post-processing of the arbitrary copy of the first job is ended, and the image forming process of the copy which succeeds can be restarted.

Preferably, the control unit restarts the image forming process of the first job which has been temporarily stopped after the post-processing of the arbitrary copy of the first job is ended and after the image forming process of the second job which has been executed while the image forming process of the first job is temporary stopped is ended.

In the image forming apparatus, the image forming process of the first job which has been temporarily stopped can be restarted after the post-processing of the arbitrary copy of the first job is ended and after the image forming process of the second job which is being executed while the image forming process of the first job is being temporarily stopped is ended. Therefore, the conflict of the image forming process of the first job and the image forming process of the second job can be prevented.

Preferably, the control unit temporarily stops the image forming process of the second job and restarts the image forming process of the first job which has been temporarily stopped after the post-processing of the arbitrary copy of the first job is ended and after the image forming process of the arbitrary copy of the second job which has been executed while the image forming process of the first job is temporarily stopped is ended in a case where the second job is the job for the plurality of copies.

In the image forming apparatus, the image forming process of the second job is temporarily stopped and the image forming process of the first job which has been temporarily stopped can be restarted after the post-processing of the arbitrary copy of the first job is ended and after the image forming process of the arbitrary copy of the second job which is being executed while the image forming process of the first job is temporarily stopped is ended when the second job is a job for a plurality of copies. Therefore, the conflict of the image forming process of the first job and the image forming process of the second job can be prevented.

Preferably, the image forming apparatus further comprises a restart selecting unit to accept a selecting instruction for selecting either one of a first restart mode and a second restart mode, wherein the first restart mode temporarily stops the image forming process of the second job and restarts the image forming process of the first job which has been temporarily stopped after the post-processing of the arbitrary copy of the first job is ended and after the image forming process of the arbitrary copy of the second job which has been executed while the image forming process of the first job is temporarily stopped is ended, and the second restart mode restarts the image forming process of the first job which has been temporarily stopped after the post-processing of the arbitrary copy of the first job is ended and after the image forming process of all copies of the second job which has been executed while the image forming process of the first job is temporarily stopped is ended.

In the image forming apparatus, the selecting instruction for selecting either one of the first restart mode and the second restart mode can be accepted. Therefore, the condition for restarting the image forming process of the first job can be set according to a preference of a user, and the flexibility of control can be improved.

Preferably, a post-processing of a job which is executed by being allowed to interrupt by the control unit is different from the post-processing of the first job.

In the image forming apparatus, the overlapping of the post-processing of the first job and the post-processing of the job which is to be executed by interrupting during the post-process of the first job can be prevented.

According to an aspect of the preferred embodiments of the present invention, there is provided an image forming apparatus comprising a dividing unit to divide jobs for a plurality of copies into a plurality of divided jobs when the jobs are registered in an order of acceptance of the jobs, the divided jobs being generated by dividing the jobs as an independent job for each copy, a divided job comparing unit to compare a time needed for a post-processing of the divided job which is generated by dividing one job by the dividing unit with a time needed for an image forming process of a divided job which is generated by dividing another job, and a registration control unit to change a registration order of the divided jobs which are generated by dividing the another job according to a comparison result of the dividing job comparing unit.

In the image forming apparatus, a plurality of divided jobs can be generated by dividing the jobs as an independent job for each copy, and the registration order of the divided jobs which are generated by dividing another job can be changes according to the result of comparing the time needed for the post-processing of the divided job which is generated by dividing one job with the time needed for the image forming process of the divided job which is generated by dividing another job. Therefore, one copy can be treated as one job, and the job execution control can be simplified. Thus, the temporary stop time of the image forming operation in the image forming apparatus can be reduced, the image forming operation can be efficient and can be speeded-up, and the productivity can be improved.

According to an aspect of the preferred embodiments of the present invention, there is provided an image forming method which registers jobs in an order of acceptance of the jobs and which carries out an image forming process and a post-processing for a recording medium according to a content of the registered jobs comprising comparing a time needed for a post-processing of a first job which is being executed with a time needed for an image forming process of a second job which is on stand-by and which is registered; and executing the image forming process of the second job which is on stand-by after an image forming process of the first job which is being executed is ended and while the post-processing of the first job is being executed, according to a comparison result obtained by the comparing.

In the image forming method, the image forming process of the second job which is on stand-by can be executed while the post-processing of the first job is being executed according to the result of comparing the time needed for the post-processing of the first job which is being executed and the time needed for the image forming process of the second job which is on stand-by and which is registered. Therefore, the temporary stop time of the image forming operation in the image forming apparatus can be reduced, the image forming operation can be efficient and can be speeded-up, and the productivity can be improved.

According to an aspect of the preferred embodiments of the present invention, there is provided an image forming method comprising dividing jobs for a plurality of copies into a plurality of divided jobs when the jobs are registered in an order of acceptance of the jobs, the divided jobs being generated by dividing the jobs as an independent job for each copy, comparing a time needed for a post-processing of the divided job which is generated by dividing one job by the dividing unit with a time needed for an image forming process of a divided job which is generated by dividing another job; and changing a registration order of the divided jobs which are generated by dividing the another job according to a comparison result obtained by the comparing.

In the image forming method, a plurality of divided jobs can be generated by dividing the jobs as an independent job for each copy, and the registration order of the divided jobs which are generated by dividing another job can be changes according to the result of comparing the time needed for the post-processing of the divided job which is generated by dividing one job with the time needed for the image forming process of the divided job which is generated by dividing another job. Therefore, one copy can be treated as one job, and the job execution control can be simplified. Thus, the temporary stop time of the image forming operation in the image forming apparatus can be reduced, the image forming operation can be efficient and can be speeded-up, and the productivity can be improved.

According to an aspect of the preferred embodiments of the present invention, there is provided a computer readable recording medium storing a program to allow a computer to function as a comparing unit to compare a time needed for a post-processing of a first job which is being executed with a time needed for an image forming process of a second job which is on stand-by and which is registered, and a control unit to execute the image forming process of the second job which is on stand-by after an image forming process of the first job which is being executed is ended and while the post-processing of the first job is being executed, according to a comparison result of the comparing unit.

In the computer readable recording medium storing the programs, the image forming process of the second job which is on stand-by can be executed while the post-processing of the first job is being executed according to the result of comparing the time needed for the post-processing of the first job which is being executed and the time needed for the image forming process of the second job which is on stand-by and which is registered. Therefore, the temporary stop time of the image forming operation in the image forming apparatus can be reduced, the image forming operation can be efficient and can be speeded-up, and the productivity can be improved.

The present U.S. patent application claims a priority under the Paris Convention of Japanese paten application No. 2007-007233 filed on Jan. 16, 2007, which shall be a basis of correction of an incorrect translation.

What is claimed is:

1. An image forming apparatus which registers jobs in an order of acceptance of the jobs and which carries out an image forming process and a post-processing for a recording medium according to a content of the registered jobs, comprising:
   a comparing unit to compare a time needed for a post-processing of a first job which is being executed with a time needed for an image forming process of a second job which is on stand-by and which is registered;
   a control unit to execute the image forming process of the second job which is on stand-by after an image forming process of the first job which is being executed is ended and while the post-processing of the first job is being executed according to a comparison result of the comparing unit; and
   a calculation unit to calculate a time needed for a post-processing of one copy of the first job and a time needed for an image forming process of one copy of the second job;
   wherein the first job and the second job are jobs for one copy or a plurality of copies,
   the comparing unit compares the time needed for the post-processing of one copy of the first job and the time needed for the image forming process of one copy of the second job, and
   the control unit executes the second job one copy by one copy and executes the image forming process of the second job by allowing the image forming process of the second job to interrupt while the image forming process of the first job is temporarily stopped by executing a post-processing of an arbitrary copy of the first job, according to the comparison result of the comparing unit.

2. The image forming apparatus of claim 1, wherein the control unit executes the image forming process of the second job by allowing the image forming process of the second job to interrupt while the image forming process of the first job is temporarily stopped by executing the post-processing of the arbitrary copy of the first job when the comparison result of the comparing unit shows that the time needed for the post-processing of one copy of the first job is longer than the time needed for the image forming process of one copy of the second job.

3. The image forming apparatus of claim 1, wherein the control unit does not execute the image forming process of the second job by not allowing the image forming process of the second job to interrupt while the image forming process of the first job is temporarily stopped by executing the post-processing of the arbitrary copy of the first job when the comparison result of the comparing unit shows that the time needed for the post-processing of one copy of the first job is less than or equal to the time needed for the image forming process of one copy of the second job.

4. An image forming apparatus which registers jobs in an order of acceptance of the jobs and which carries out an image forming process and a post-processing for a recording medium according to a content of the registered jobs, comprising:
   a comparing unit to compare a time needed for a post-processing of a first job which is being executed with a time needed for an image forming process of a second job which is on stand-by and which is registered;
   a control unit to execute the image forming process of the second job which is on stand-by after an image forming process of the first job which is being executed is ended and while the post-processing of the first job is being executed according to a comparison result of the comparing unit; and
   a calculation unit to calculate a time needed for a post-processing of one copy of the first job and a time needed for an image forming process of all copies of the second job;
   wherein the first job and the second job are jobs for one copy or a plurality of copies,
   the comparing unit compares the time needed for the post-processing of one copy of the first job with the time needed for the image forming process of all copies of the second job, and
   the control unit executes the second job one copy by one copy and executes the second job by allowing the second job to interrupt while an image forming process of the first job is temporarily stopped by executing a post-processing of an arbitrary copy of the first job, according to the comparison result of the comparing unit.

5. The image forming apparatus of claim 4, wherein
the control unit executes the second job by allowing the second job to interrupt while the image forming process of the first job is temporarily stopped by executing the post-processing of the arbitrary copy of the first job when the comparison result of the comparing unit shows that the time needed for the post-processing of one copy of the first job is longer than the time needed for the image forming process of all copies of the second job.

6. The image forming apparatus of claim 4, wherein
the control unit does not execute the second job by not allowing the second job to interrupt while the image forming process of the first job is temporarily stopped by executing the post-processing of the arbitrary copy of the first job when the comparison result of the comparing unit shows that the time needed for the post-processing of one copy of the first job is less than or equal to the time needed for the image forming process of all copies of the second job.

7. The image forming apparatus of claim 1, further comprising:
a comparing object selecting unit to accept a selecting instruction for selecting either one of a first comparison mode and a second comparison mode, wherein
the first comparison mode compares the time needed for the post-processing of one copy of the first job with the time needed for the image forming process of one copy of the second job, and
the second comparison mode compares the time needed for the post-processing of one copy of the first job with a time needed for an image forming process of all copies of the second job.

8. The image forming apparatus of claim 1, further comprising:
an execution job selecting unit to accept a selecting instruction for selecting either one of a first execution mode, a second execution mode and a third execution mode, wherein
the first execution mode executes the second job by allowing the second job to interrupt while the image forming process of the first job is temporarily stopped by executing the post-processing of the arbitrary copy of the first job,
the second execution mode does not execute the second job by not allowing the second job to interrupt while the image forming process of the first job is temporarily stopped by executing the post-processing of the arbitrary copy of the first job, and
the third execution mode executes a process of executing the second job by allowing the second job to interrupt while the image forming process of the first job is temporarily stopped by executing the post-processing of the arbitrary copy of the first job, according to a comparison result of the control unit.

9. The image forming apparatus of claim 1, wherein
the control unit restarts the image forming process of the first job which has been temporarily stopped when the post-processing of the arbitrary copy of the first job is ended.

10. The image forming apparatus of claim 9, wherein
the control unit restarts the image forming process of the first job which has been temporarily stopped after the post-processing of the arbitrary copy of the first job is ended and after the image forming process of the second job which has been executed while the image forming process of the first job is temporary stopped is ended.

11. The image forming apparatus of claim 9, wherein
the control unit temporarily stops the image forming process of the second job and restarts the image forming process of the first job which has been temporarily stopped after the post-processing of the arbitrary copy of the first job is ended and after the image forming process of the arbitrary copy of the second job which has been executed while the image forming process of the first job is temporarily stopped is ended in a case where the second job is the job for the plurality of copies.

12. The image forming apparatus of claim 1, further comprising:
a restart selecting unit to accept a selecting instruction for selecting either one of a first restart mode and a second restart mode, wherein
the first restart mode temporarily stops the image forming process of the second job and restarts the image forming process of the first job which has been temporarily stopped after the post-processing of the arbitrary copy of the first job is ended and after the image forming process of the arbitrary copy of the second job which has been executed while the image forming process of the first job is temporarily stopped is ended, and
the second restart mode restarts the image forming process of the first job which has been temporarily stopped after the post-processing of the arbitrary copy of the first job is ended and after the image forming process of all copies of the second job which has been executed while the image forming process of the first job is temporarily stopped is ended.

13. The image forming apparatus of claim 1, wherein a post-processing of a job which is executed by being allowed to interrupt by the control unit is different from the post-processing of the first job.

14. The image forming apparatus of claim 4, wherein a post-processing of a job which is executed by being allowed to interrupt by the control unit is different from the post-processing of the first job.

* * * * *